United States Patent
Seong et al.

(10) Patent No.: US 11,059,379 B2
(45) Date of Patent: Jul. 13, 2021

(54) POSITION ALIGNMENT APPARATUS AND METHOD FOR WIRELESS CHARGING

(71) Applicants: Hyundai Motor Company, Seoul (KR); Kia Motors Corporation, Seoul (KR); Industry-University Cooperation Foundation Hanyang University, Seoul (KR)

(72) Inventors: Jae Yong Seong, Gyeonggi-do (KR); Sang Sun Lee, Seoul (KR)

(73) Assignees: Hyundai Motor Company, Seoul (KR); Kia Motors Corporation, Seoul (KR); Industry-University Cooperation Foundation Hanyang University, Seoul (KR)

(*) Notice: Subject to any disclaimer, the term of this patent is extended or adjusted under 35 U.S.C. 154(b) by 191 days.

(21) Appl. No.: 16/567,697

(22) Filed: Sep. 11, 2019

(65) Prior Publication Data

US 2020/0079237 A1 Mar. 12, 2020

Related U.S. Application Data

(60) Provisional application No. 62/732,840, filed on Sep. 18, 2018, provisional application No. 62/729,772, filed on Sep. 11, 2018.

(30) Foreign Application Priority Data

Aug. 8, 2019 (KR) .................... 10-2019-0096994

(51) Int. Cl.
*B60L 53/38* (2019.01)
*H02J 50/80* (2016.01)
(Continued)

(52) U.S. Cl.
CPC ............. *B60L 53/38* (2019.02); *B60L 53/126* (2019.02); *B60L 53/305* (2019.02); *H02J 7/025* (2013.01);
(Continued)

(58) Field of Classification Search
CPC ...... B60L 53/38; B60L 53/126; B60L 53/305; B60L 53/35; B60L 53/12; H02J 50/80;
(Continued)

(56) References Cited

U.S. PATENT DOCUMENTS

2013/0335015 A1* 12/2013 Ichikawa ................ H02J 50/80
320/108
2015/0015419 A1 1/2015 Halker et al.
(Continued)

FOREIGN PATENT DOCUMENTS

CN 103828193 A * 5/2014 ............... B60L 53/38
CN 106103178 A * 11/2016 ............ B60L 53/305
(Continued)

*Primary Examiner* — Stacy Whitmore
(74) *Attorney, Agent, or Firm* — Mintz Levin Cohn Ferris Glovsky and Popeo, P.C.; Peter F. Corless

(57) ABSTRACT

A position alignment method for wireless charging performed by a VA for position alignment with a target GA is provided. The method includes identifying states of a plurality of GAs via wireless communication with an SECC that operates the plurality of GAs and receiving, from the SECC, information regarding one or more available GAs of the plurality of GAs. A target GA based is selected on the information regarding available GAs and a wireless communication association with the target GA is performed. A procedure for position alignment approval and a procedure for authentication is executed by a request to the SECC and in response to determining that the authentication is successful, position alignment with the target GA using LF signals is performed, wherein LF signals assigned to each (Continued)

GA are distinguished from LF signals assigned to other GAs in a TDM scheme.

20 Claims, 31 Drawing Sheets

(51) Int. Cl.
    *H02J 50/90*     (2016.01)
    *H02J 50/12*     (2016.01)
    *B60L 53/126*     (2019.01)
    *H02J 7/02*     (2016.01)
    *H04Q 11/04*     (2006.01)
    *H02J 7/00*     (2006.01)
    *B60L 53/35*     (2019.01)
    *B60L 53/12*     (2019.01)
    *B60L 53/30*     (2019.01)

(52) U.S. Cl.
    CPC ............. *H02J 50/12* (2016.02); *H02J 50/80* (2016.02); *H02J 50/90* (2016.02); *H04Q 11/0421* (2013.01); *H02J 7/00045* (2020.01); *H04Q 2213/13* (2013.01); *H04Q 2213/13292* (2013.01)

(58) Field of Classification Search
    CPC .. H02J 50/90; H02J 50/12; H02J 7/025; H02J 7/00045; H04Q 11/0421; H04Q 2213/13; H04Q 2213/13292; Y02T 90/12; Y02T 10/7072; Y02T 90/14; Y02T 10/70; Y02T 90/16
    See application file for complete search history.

(56) References Cited

U.S. PATENT DOCUMENTS

| | | | |
|---|---|---|---|
| 2016/0064994 A1* | 3/2016 | Ku | H04B 5/0037 307/104 |
| 2017/0232853 A1* | 8/2017 | Lazarev | B60L 53/20 307/10.1 |
| 2018/0072173 A1 | 3/2018 | Hwang et al. | |
| 2019/0118657 A1* | 4/2019 | Wang | B60L 53/12 |
| 2019/0202304 A1* | 7/2019 | Moghe | B60L 53/39 |
| 2021/0061117 A1* | 3/2021 | Singuru | B60L 53/665 |

FOREIGN PATENT DOCUMENTS

| | | | | |
|---|---|---|---|---|
| CN | 110015069 A | * | 7/2019 | |
| KR | 2017-0044905 A | | 4/2017 | |
| KR | 2018-0003995 A | | 1/2018 | |
| KR | 2018-0029860 A | | 3/2018 | |
| WO | WO-2017083685 A1 | * | 5/2017 | ......... G01C 21/3469 |

* cited by examiner

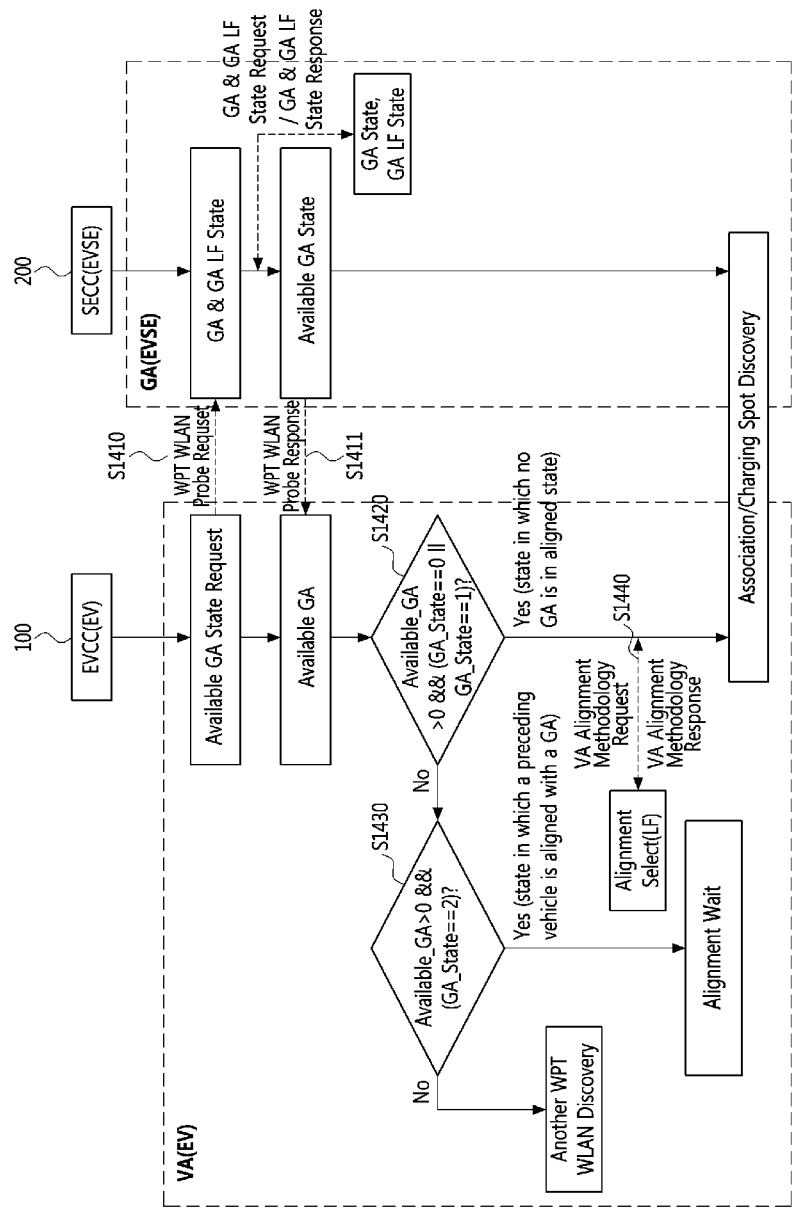

POSITION ALIGNMENT APPARATUS AND METHOD FOR WIRELESS CHARGING

CROSS-REFERENCES TO RELATED APPLICATIONS

The present application claims the benefit of priority to U.S. Provisional Patent Applications No. 62/729,772 filed on Sep. 11, 2018 and No. 62/732,840 filed on Sep. 18, 2018 with the U.S. Patent and Trademark Office, and Korean Patent Application No. 10-2019-0096994, filed on Aug. 8, 2019 with the Korean Intellectual Property Office (KIPO), the entire contents of which are incorporated herein by reference.

TECHNICAL FIELD

The present disclosure relates to a position alignment method and a position alignment apparatus for wireless charging, and more specifically, to a method and an apparatus of performing position alignment for wireless charging by using low-frequency (LF) signals.

BACKGROUND

An electric vehicle (EV) drives an electric motor by a power of a battery, and has less air pollution sources such as exhaust gas and noise compared with a conventional gasoline engine vehicle, fewer faults, a long life, and an advantage that the operation thereof is simple. The EVs are classified into hybrid electric vehicles (HEVs), plug-in hybrid electric vehicles (PHEVs), and electric vehicles (EVs), depending on a driving source. The HEV has an engine as a main power and a motor as an auxiliary power. The PHEV has a main power motor and an engine used when a battery is discharged. The EV has a motor, but it does not have an engine.

The wireless charging of the battery for driving the electric motor of the EV may be performed by coupling a primary coil of a charging station with a secondary coil of the EV in a magnetic resonance manner. Additionally, in a magnetic resonance wireless power transfer (WPT) system, if the primary and secondary coils are not aligned, the efficiency of the WPT may be reduced substantially. Therefore, the alignment of the primary coils and the secondary coils is required.

As a conventional alignment scheme, there is a technique of aligning an EV equipped with a secondary coil to a primary coil of a ground assembly (GA) using a rear camera. Another developed technique teaches moving a movable charging pad after an EV is parked in a parking area by a bump to align a primary coil of the charging pad with a secondary coil of the EV. However, such the conventional techniques may cause user's intervention in the alignment of the coils, inconvenience due to the user's intervention, and a substantial deviation of the alignment, which may lead to excessive system performance deterioration due to slight coil misalignment. Therefore, in the magnetic resonance WPT system sensitive to the misalignment of the coils, it is difficult to realize the optimum power transfer efficiency, and the stability and reliability of the system may be reduced.

Accordingly, there is a need for a method of precisely aligning a primary coil of a GA of a charging station and a secondary coil of an EV to charge a high voltage battery mounted in the EV in the WPT system.

SUMMARY

The present disclosure provides a position alignment method for wireless charging, in which position alignment is performed using low-frequency (LF) signals. Additionally, the present disclosure provides a position alignment apparatus for wireless charging, which performs position alignment using LF signals. The present disclosure further provides a method of controlling position alignment for wireless charging using LF signals.

According to exemplary embodiments of the present disclosure, a position alignment method for wireless charging, performed by a vehicle assembly (VA) for position alignment with a target ground assembly (GA) among a plurality of GAs, may include identifying states of the plurality of GAs via wireless communication with a supply equipment communication controller (SECC) configured to operate the plurality of GAs; receiving, from the SECC, information regarding one or more available GAs of the plurality of GAs; selecting the target GA based on the information regarding the one or more available GAs, and performing a wireless communication association with the target GA; performing a procedure for position alignment approval and a procedure for authentication by requesting to the SECC; and in response to determining that the authentication is successful, performing position alignment with the target GA using low-frequency (LF) signals, wherein LF signals assigned to each GA are distinguished from LF signals assigned to other GAs in a time division multiplexing (TDM) scheme.

The information regarding the one or more available GAs may include at least one of a GA identifier (ID), unique information of an LF system, and wireless signal strength information of each GA among the one or more available GAs. The unique information of the LF system may include at least one of an LF collision avoidance signal, an LF ID, LF antenna information, and magnetic field detection sensitivity per antenna of the each GA among the one or more available GAs.

The selecting of the target GA may include comparing wireless signal strengths of the one or more available GAs with each other; and selecting a GA having a highest wireless signal strength as the target GA. Each of the states of the plurality of GAs may be classified into a normal state capable of wireless charging, a charging state, and an aligned state.

The performing of the wireless communication association with the target GA may include modifying LF information of the EV based on LF information of the selected target GA. The LF information of the EV to be modified may include at least one of an LF collision avoidance signal, a SYNC, a VA ID, and an LF ID.

Furthermore, according to exemplary embodiments of the present disclosure, a position alignment apparatus performing position alignment with a target GA among a plurality of GAs may include at least one processor and a memory storing at least one instruction executable by the at least one processor. When executed by the at least one processor, the at least one instruction may be configured to identify states of the plurality of GAs via wireless communication with an SECC configured to operate the plurality of GAs; receive from the SECC information regarding one or more available GAs of the plurality of GAs; select the target GA based on the information regarding the one or more available GAs, and perform a wireless communication association with the target GA; perform a procedure for position alignment approval and a procedure for authentication by requesting to the SECC; and in response to determining that the authentication is successful, perform position alignment with the target GA using LF signals, wherein LF signals assigned to each GA are separated from LF signals assigned to other GAs in a TDM scheme.

The information regarding the one or more available GAs may include at least one of a GA identifier (ID), unique information of an LF system, and wireless signal strength information of each GA among the one or more available GAs. The unique information of the LF system may include at least one of an LF collision avoidance signal, an LF ID, LF antenna information, and magnetic field detection sensitivity per antenna of the each GA among the one or more available GAs.

The selecting of the target GA may include comparing wireless signal strengths of the one or more available GAs with each other; and selecting a GA having a highest wireless signal strength as the target GA. Each of the states of the plurality of GAs may be classified into a normal state capable of wireless charging, a charging state, and an aligned state.

The performing of the wireless communication association with the target GA may include modifying LF information of the EV based on LF information of the selected target GA. The LF information of the EV to be modified may include at least one of an LF collision avoidance signal, a SYNC, a VA ID, and an LF ID.

Furthermore, according to exemplary embodiments of the present disclosure, a method for controlling position alignment for wireless charging, performed by an SECC configured to operate a plurality of GAs may include providing information regarding states of one or more available GAs to an EV entering into a wireless communication region of the SECC; performing a wireless communication association between an EVCC of the EV and an SECC of a target GA selected by the EV among the one or more available GAs; performing a procedure for position alignment approval and a procedure for authentication with the EV and the target GA according to a request of the EVCC; and in response to determining that the authentication procedure is successful, performing position alignment between the EV and the target GA using low-frequency (LF) signals according to authentication success, wherein LF signals assigned to each GA are separated from LF signals assigned to other GAs in a time division multiplexing (TDM) scheme.

The information regarding the one or more available GAs may include at least one of a GA ID, unique information of an LF system, and wireless signal strength information of each GA among the one or more available GAs. The unique information of the LF system may include at least one of information regarding an LF collision avoidance signal, an LF ID, LF antenna information, and magnetic field detection sensitivity per antenna of the each GA among the one or more available GAs.

The performing of the wireless communication association between the EVCC of the EV and the SECC of the target GA may include determining a wireless communication error by detecting whether a GA ID of the target GA, which is received from the EVCC, is changed. The performing of the procedure for position alignment approval and the procedure for authentication may include verifying an error by comparing an LF collision avoidance signal received from the EVCC with an LF collision avoidance signal held by the target GA. The providing of the information regarding states of one or more available GAs may include, when a preceding vehicle aligned with a GA exists, notifying the presence of the preceding vehicle to the vehicle entering into the wireless communication region of the SECC.

According to the exemplary embodiments of the present disclosure, when a plurality of vehicles are detected in a wireless charging area, magnetic field values necessary for position alignment may be prevented from being distorted due to the interference between magnetic fields of the LF antennas, which are emitted by the different vehicles and cause the correct position alignment data from being acquired. In addition, when there are a plurality of GAs, overlapping between LF collision avoidance signals of the respective GAs may be prevented, and thus, each EV may properly distinguish the GAs in the WPT system for EVs.

BRIEF DESCRIPTION OF DRAWINGS

The present disclosure will become more apparent by describing in detail exemplary embodiments of the present disclosure with reference to the accompanying drawings, in which:

FIG. 14 is a diagram illustrating another example of an operation flow in a wireless communication discovery step in a position alignment method according to an exemplary embodiment of the present disclosure;

Figure 1:
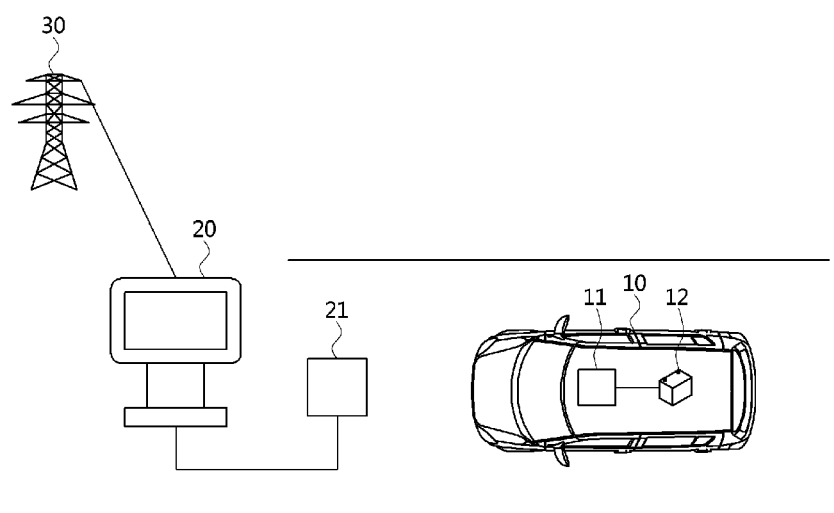
FIG. 1 is a conceptual diagram illustrating a concept of a wireless power transfer (WPT) to which exemplary embodiments of the present disclosure are applied.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Embodiments of the present disclosure are disclosed herein. However, specific structural and functional details disclosed herein are merely representative for purposes of describing exemplary embodiments of the present disclosure, however, exemplary embodiments of the present disclosure may be embodied in many alternate forms and should not be construed as limited to exemplary embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

According to exemplary embodiments of the present disclosure, an EV charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle (H.D. Vehicle)": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the alternating current (AC) supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Additionally, the utility may provide information about certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which components of a system interwork with corresponding components of the system in order to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA. The GA may be referred to as a supply device, and the VA may be referred to as an EV device.

"Supply device": An apparatus which provides the contactless coupling to the EV device. In other words, the supply device may be an apparatus external to an EV. When the EV is receiving power, the supply device may operate as the source of the power to be transferred. The supply device may include the housing and all covers.

"EV device": An apparatus mounted on the EV which provides the contactless coupling to the supply device. In other words, the EV device may be installed in the EV. When the EV is receiving power, the EV device may transfer the power from the primary to the EV. The EV device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level. The GA controller may be referred to as a supply power circuit (SPC), and the VA controller may be referred to as an electric vehicle (EV) power circuit (EVPC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure. The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions may generate a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of supply device to EV device and/or finding the relative position of EV device to supply device for the efficient power transfer that is specified. In the present disclosure, the alignment may direct to a fine positioning of the wireless power transfer system.

"Pairing": A process by which a vehicle is correlated with the unique dedicated supply device, at which it is located and from which the power will be transferred. Pairing may include the process by which a VA controller and a GA controller of a charging spot are correlated. The correlation/association process may include the process of association of a relationship between two peer communication entities.

"High-level communication (HLC)": HLC is a special type of digital communication. HLC is necessary for additional services which are not covered by command & control communication. The data link of the HLC may use a power line communication (PLC), but it is not limited.

"Low-power excitation (LPE)": LPE means a technique of activating the supply device for the fine positioning and pairing so that the EV may detect the supply device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID may be generated with any value.

The charging station may include at least one GA and at least one GA controller configured to manage the at least one GA. The GA may include at least one wireless communication device. The charging station may refer to a place or location having at least one GA, which is installed in home, office, public place, road, parking area, etc. According to exemplary embodiments of the present disclosure, "rapid charging" may refer to a method of directly converting AC power of a power system to direct current (DC) power, and supplying the converted DC power to a battery mounted on an EV. In particular, a voltage of the DC power may be DC 500 volts (V) or less.

According to exemplary embodiments of the present disclosure, "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. The EV may further include an on-board charger (OBC) configured to boost the AC power for the slow charging, convert the AC power to DC power, and supply the converted DC power to the battery.

According to exemplary embodiments of the present disclosure, a frequency tuning may be used for performance optimization. In particular, the frequency tuning may be performed by a supply device and may not be performed by an EV device. Additionally, it may be required for all the supply devices to provide the frequency tuning over a full range. An electric vehicle power controller (EVPC) may operate in a frequency range between about 81.38 kHz and 90.00 kHz. A nominal frequency (hereinafter, referred to as a target frequency, a design frequency, or a resonance frequency) for the magnetic field wireless power transfer (MF-WPT) may be about 85 kHz. The power supply circuits may provide the frequency tuning.

Hereinafter, exemplary embodiments of the present disclosure will be explained in detail by referring to accompanying figures.

FIG. 1 is a conceptual diagram illustrating a concept of a wireless power transfer (WPT) to which exemplary embodiments of the present disclosure are applied. As shown in FIG. 1, a WPT may be performed by at least one component of an electric vehicle (EV) 10 and a charging station 20, and may be used for wirelessly transferring power to the EV 10. The EV 10 may be usually defined as a vehicle supplying an electric power stored in a rechargeable energy storage including a battery 12 as an energy source of an electric motor which is a power train system of the EV 10.

However, the EV 10 according to exemplary embodiments of the present disclosure may include a hybrid electric vehicle (HEV) having an electric motor and an internal combustion engine together, and may include not only an automobile but also a motorcycle, a cart, a scooter, and an electric bicycle. Additionally, the EV 10 may include a power reception pad 11 including a reception coil for charging the battery 12 wirelessly and may include a plug connection for conductively charging the battery 12. In particular, the EV 10 configured for conductively charging the battery 12 may be referred to as a plug-in electric vehicle (PEV).

The charging station 20 may be connected to a power grid 30 or a power backbone, and may provide an alternating current (AC) power or a direct current (DC) power to a power transmission pad 21 including a transmission coil through a power link. Additionally, the charging station 20 may be configured to communicate with an infrastructure management system or an infrastructure server that manages the power grid 30 or a power network via wired/wireless communications, and perform wireless communications with the EV 10. The wireless communications may be Bluetooth, ZigBee, cellular, wireless local area network (WLAN), or the like. For example, the charging station 20 may be located at various places including a parking area attached to the a house, a parking area for charging an EV at a gas station, a parking area at a shopping center or a workplace.

A process of wirelessly charging the battery 12 of the EV 10 may begin with first disposing the power reception pad 11 of the EV 10 in an energy field generated by the power transmission pad 21, and coupling the reception coil and the transmission coil with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning. All or part of the internal components and the reception pad 11 of the EV 10 may be referred to as a vehicle assembly (VA), in which the VA may refer to the previously defined meaning. The power transmission pad or the power reception pad may be configured to be non-polarized or polarized.

When a pad is non-polarized, one pole is disposed in a center of the pad and an opposite pole is disposed in an external periphery. In particular, a flux may be formed to exit from the center of the pad and return at all to external boundaries of the pad. When a pad is polarized, a respective pole may be disposed at either end portion of the pad. In particular, a magnetic flux may be formed based on an orientation of the pad. In the present disclosure, the transmission pad 21 or the reception pad 11 may collectively be referred to as a "wireless charging pad".

Figure 2:
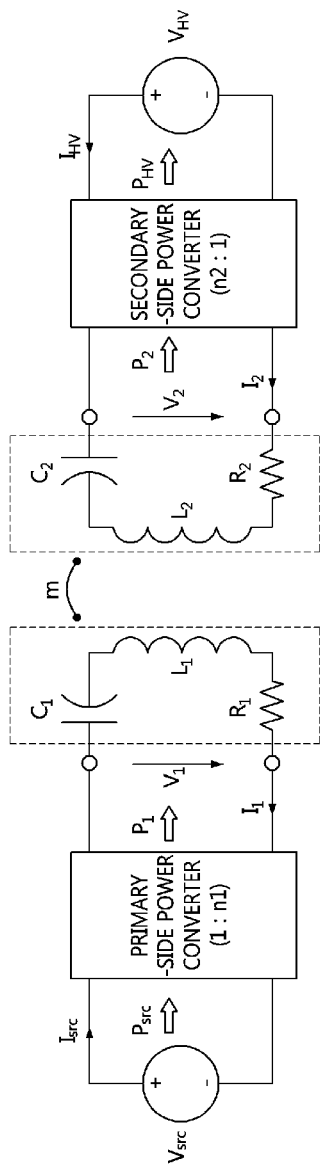
FIG. 2 is a conceptual diagram illustrating a WPT circuit according to exemplary embodiments of the present disclosure.

FIG. 2 is a conceptual diagram illustrating a WPT circuit according to exemplary embodiments of the present disclosure. As shown in FIG. 2, a schematic configuration of a circuit in which a WPT is performed in an EV WPT system is shown. The left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left-side circuit of FIG. 2 may provide an output power $P_{src}$ that corresponds to the power source $V_{src}$ supplied from the power network to a primary-side power converter. The primary-side power converter may be configured to supply an output power $P_1$ converted from the output power $P_{src}$ through frequency-converting and AC-to-DC/DC-to-AC converting to generate an electromagnetic field at a desired operating frequency in a transmission coil $L_1$.

Specifically, the primary-side power converter may include an AC/DC converter configured to convert the power $P_{src}$ which is an AC power supplied from the power network into a DC power, and a low-frequency (LF) converter configured to convert the DC power into an AC power having an operating frequency suitable for wireless charging. For example, the operating frequency for wireless charging may be determined to be within about 79 to 90 kHz.

The power $P_1$ output from the primary-side power converter may be supplied again to a circuit including the transmission coil $L_1$, a first capacitor $C_1$ and a first resistor $R_1$. In particular, a capacitance of the first capacitor $C_1$ may be determined as a value to have an operating frequency suitable for charging together with the transmission coil $L_1$. The first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction. Still further, the power $P_2$ induced in or transferred to the reception coil $L_2$ may be provided to a secondary-side power converter. Particularly, a capacitance of a second capacitor $C_2$ may be determined as a value having an operating frequency suitable for wireless charging together with the reception coil $L_2$, and a second resistor $R_2$ may represent a power loss occurring by the reception coil $L_2$ and the second capacitor $C_2$.

The secondary-side power converter may include an AC-to-DC converter configured to convert the supplied power $P_2$ of a specific operating frequency to a DC power having a voltage level suitable for the battery $V_{HV}$ of the EV. The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. In particular, resonance frequencies of the transmission coil $L_1$ and the reception coil $L_2$ may be similar or identical to each other, and the reception coil $L_2$ may be positioned near the electromagnetic field generated by the transmission coil $L_1$. The circuit of FIG. 2 should be understood as an illustrative circuit for WPT in the EV WPT system used for exemplary embodiments of the present disclosure, and is not limited to the circuit illustrated in FIG. 2.

On the other hand, since the power loss may increase as the transmission coil $L_1$ and the reception coil $L_2$ are separated by a predetermined distance, the relative positions of the transmission coil $L_1$ and the reception coil $L_2$ may be set. The transmission coil $L_1$ may be included in the transmission pad 21 in FIG. 1, and the reception coil $L_2$ may be included in the reception pad 11 in FIG. 1. Additionally, the transmission coil may be referred to as a GA coil, and the reception coil may be referred to as a VA coil. Therefore, position alignment between the transmission pad and the reception pad or position alignment between the EV and the transmission pad will be described below with reference to the drawings.

Figure 3:
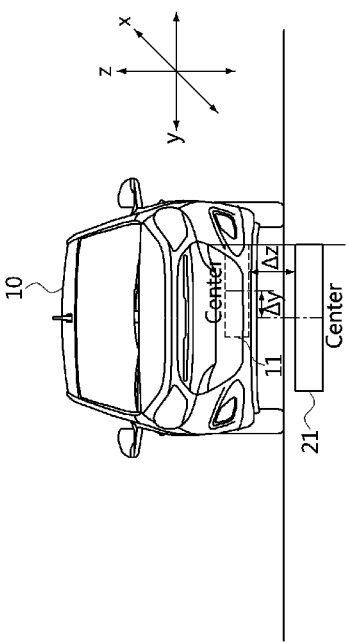
FIG. 3 is a conceptual diagram for explaining a concept of alignment in an EV WPT according to exemplary embodiments of the present disclosure.

FIG. 3 is a conceptual diagram for explaining a concept of alignment in an EV WPT according to exemplary embodiments of the present disclosure. As shown in FIG. 3, a method of aligning the power transmission pad 21 and the power reception pad 11 in the EV in FIG. 1 will be described. In particular, positional alignment may correspond to the alignment, which is the above-mentioned term, and thus may be defined as positional alignment between the GA and the VA, but is not limited to the alignment of the transmission pad and the reception pad. Although the transmission pad 21 is illustrated as positioned below a ground surface as shown in FIG. 3, the transmission pad 21 may also be positioned on the ground surface, or positioned to expose a top portion surface of the transmission pad 21 below the ground surface.

The reception pad 11 of the EV may be defined by different categories based on heights (defined in the z-direction) measured from the ground surface. For example, a class 1 for reception pads having a height of about 100-150 millimeters (mm) from the ground surface, a class 2 for reception pads having a height of about 140-210 mm, and a class 3 for reception pads having a height of about 170-250 mm may be defined. The reception pad may support a part of the above-described classes 1 to 3. For example, only the class 1 may be supported according to the type of the reception pad 11, or the class 1 and 2 may be supported according to the type of the reception pad 11. The height of the reception pad measured from the ground surface may correspond to the previously defined term "vehicle magnetic ground clearance."

Further, the position of the power transmission pad 21 in the height direction (i.e., defined in the z-direction) may be determined to be disposed between the maximum class and the minimum class supported by the power reception pad 11. For example, when the reception pad supports only the class 1 and 2, the position of the power transmission pad 21 may be determined between about 100 and 210 mm with respect to the power reception pad 11.

In addition, a gap between the center of the power transmission pad 21 and the center of the power reception pad 11 may be determined to be disposed within the limits of the horizontal and vertical directions (defined in the x- and y-directions). For example, the gap may be determined to be located within ±75 mm in the horizontal direction (defined in the (−y)-direction or in the right direction perpendicular to the vehicle direction), and within ±100 mm in the vertical direction (defined in the (−x)-direction or in a vehicle travelling direction). The relative positions of the power transmission pad 21 and the power reception pad 11 may be varied in accordance with experimental results, and the numerical values should be understood as exemplary.

Although the alignment between the pads is described on the assumption that each of the transmission pad 21 and the reception pad 11 includes a coil, more specifically, the alignment between the pads may refer to the alignment between the transmission coil (or GA coil) and the reception coil (or VA coil) which are respectively included in the transmission pad 21 and the reception pad 11.

Meanwhile, to maximize charging efficiency during wireless charging to an EV, low-frequency (LF) signals may be used for a method of aligning a primary coil (i.e., GA coil) with a secondary coil (i.e., VA coil). Further, in the society of automotive engineers (SAE) standard meetings, considering autonomous driving technology, position alignment techniques using autonomous (or, automatic) parking or remote parking is being studied.

According to ISO 15118-8 that is an EV charging communication standard document, when wireless communication for charging an EV is used, communication between an electric vehicle communication controller (EVCC) and a supply equipment communication controller (SECC) conforms to the IEEE 802.11-2012. A required range of a distance between the EVCC and the SECC for a communication channel considered in the wireless communication is 5 m to 30 m for discovery, 10 cm to 5 m for fine positioning (fine alignment), and 5 cm to 5 m for charge control.

Particularly, the discovery is a step in which an EV searches for a charging pad, and the EVCC enters a communication region of at least one SECC and connects with an appropriate SECC. The fine positioning may refer to alignment between primary and EV devices (i.e., coils) for efficient power transfer in case of WPT, and alignment between connectors of the EV and an EVSE for power transfer in case of an automatic connection for conductive charging. The charge control may be in form of, for example, a power request from the EV to the EVSE.

Figure 4:
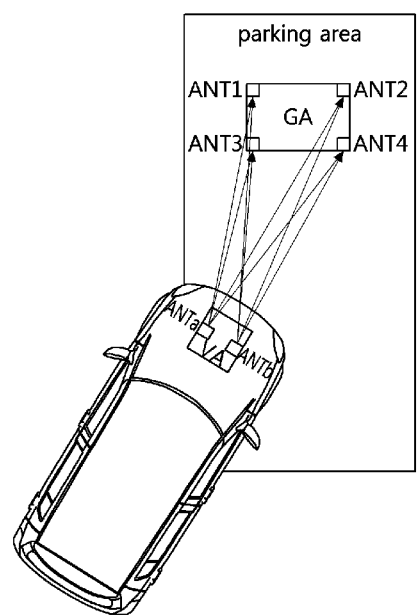
FIG. 4 is a conceptual diagram illustrating position alignment for wireless charging to which exemplary embodiments of the present disclosure are applied.

FIG. 4 is a conceptual diagram illustrating position alignment for wireless charging to which exemplary embodiments of the present disclosure are applied. As shown in FIG. 4, a position alignment method according to an exemplary embodiment of the present disclosure, which is a method for maximizing and/or optimizing the wireless charging efficiency by aligning a primary coil of a GA to a secondary coil of a VA, may be performed based on measurement of magnetic fields between four antennas ANT1, ANT2, ANT3 and ANT4 in the GA side and two antennas ANTa and ANTb in the VA side.

More specifically, the VA may include two antennas, and the two antennas may be disposed one by one (e.g., sequentially) in the left and right regions of the VA. The left and right regions may refer to regions divided into two halves of the VA, and may be left and right symmetrically separated regions. When the VA has a rectangular structure, the two antennas may be disposed at the center of the left side and the center of the right side respectively of the rectangular structure, but the structure is not limited to a rectangle because it may be changed according to a design selection.

Additionally, the two antennas may be disposed in a specific portion of the vehicle as connected with the VA, in which case they may be disposed one by one in the left and right regions of the specific portion of the vehicle. The left region and the right region of the specific portion of the vehicle may refer to symmetrically separated regions in the specific portion of the vehicle. Alternatively, instead of the left and right regions of the specific portion of the VA or the vehicle, a front region and a rear region of the specific portion of the VA or the vehicle may be used, but are not limited thereto. In other words, two regions that are symmetrically separated may be generally used. Hereinafter, it will be assumed that the antennas are disposed in the VA.

The VA or a VA controller may include a position alignment apparatus configured to operate the antennas and calculate position difference information between the VA and the GA. The GA may include four antennas, and the four antennas may be disposed in a first region, a second region, a third region, and a fourth region of the GA, respectively, and the first, second, third, and fourth regions may refer to a upper left region, a upper right region, a lower left region, and a lower right region of the GA, respectively. However, exemplary embodiments of the present disclosure are not limited thereto, and may refer to regions divided from the GA into quadrants to have the same size.

When the GA has a rectangular structure, the four antennas may be disposed at each corner of the rectangular structure, but the structure is not limited to a rectangle because it may be changed according to a design selection. Additionally, the GA or a GA controller may also include a magnetic field detection apparatus configured to calculate magnetic field measurement values based on magnetic fields detected by the four antennas and transmitting the magnetic field measurement values to the position alignment apparatus.

Herein, the antenna included in the VA and/or GA may refer to a loop antenna or may refer to a ferrite rod antenna, but is not limited thereto. The ferrite rod antenna may refer to an antenna using an LF. The LF may refer to an LF band using a band of 30 to 300 kHz among 12 frequency ranges classified by International Telecommunication Union (ITU).

Figure 5:
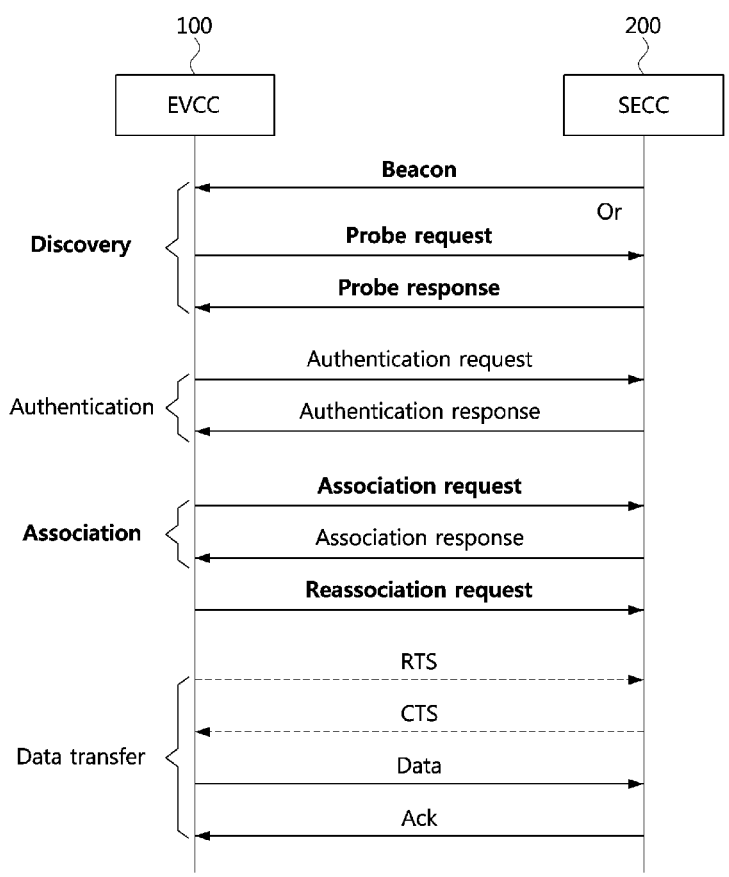
FIG. 5 is a diagram illustrating a wireless communication procedure for charging an EV according to exemplary embodiments of the present disclosure.

FIG. 5 is a diagram illustrating a wireless communication procedure for charging an EV. As shown in FIG. 5, a wireless communication procedure performed between an EVCC 100 and an SECC 200 for charging an EV (i.e., EV charging) may include a discovery step, an authentication step, an association step, and a data transfer step. Among frames used in these steps, frames redefined by the ISO 15118-8 for wireless charging may include a beacon frame, a probe request frame, and a probe response frame of the discovery step, and an association request frame and a reassociation request frame of the association step.

Figure 6:
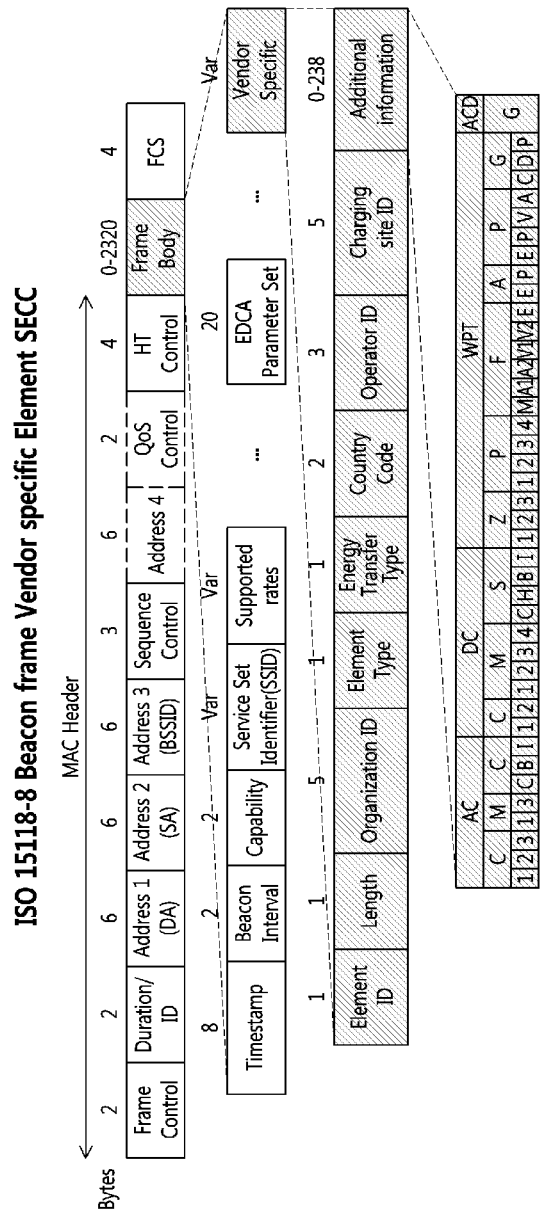
FIG. 6 is a diagram illustrating a MAC header structure of a communication frame used for position alignment for wireless charging, which may be applied to exemplary embodiments of the present disclosure.

FIG. 6 is a diagram illustrating a MAC header structure of a communication frame used for position alignment for wireless charging, which may be applied to exemplary embodiments of the present disclosure. The ISO 15118-8, one of the wireless charging standards, complies with the IEEE 802.11-2012, but redefines some of MAC management frames for wireless communication (i.e., vehicle-to-grid (V2G) communication) for EV charging.

As shown in FIG. 6, a structure of a MAC header of a beacon frame among the MAC management frames for wireless communication (V2G) for EV charging, which is additionally defined by the ISO 15118-8, is illustrated. A part redefined in the corresponding frame is a vender specific element of a frame body. The element describes various charger information and information related to power transfer schemes (AC, DC, WPT, or ACD).

In the ISO 15118-8, some of the MAC management frames are specified for each step of the wireless communication procedure. In addition to the beacon frame shown in FIG. 4, as frames related to other steps of the wireless communication procedure, a probe request frame, a probe response frame, an association request frame, and a reassociation request frame are provided.

Figure 7:
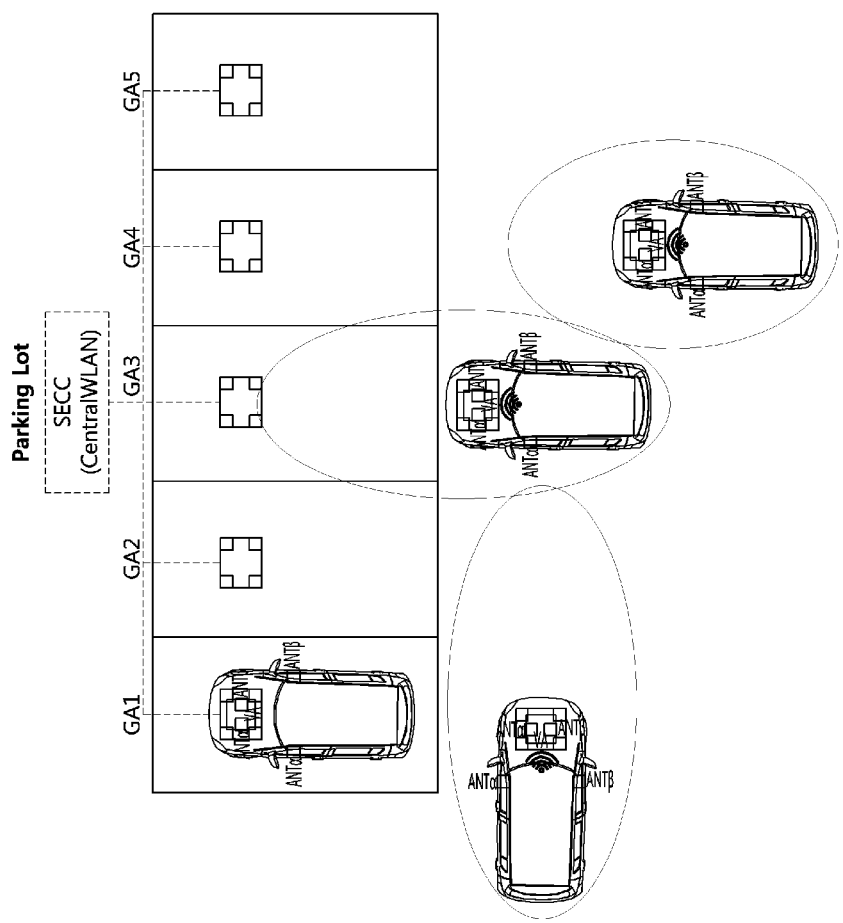
FIG. 7 is a conceptual diagram illustrating magnetic field interferences caused by wireless charging for a plurality of vehicles according to exemplary embodiments of the present disclosure.

FIG. 7 is a conceptual diagram illustrating magnetic field interferences caused by wireless charging for a plurality of vehicles. When the GA and a vehicle equipped with the VA perform position alignment using the LF antennas, the VA may try to maximize magnetic fields to be transmitted, and the GA may try to minimize magnetic fields detected by the GA. As shown in FIG. 7, it may be assumed that at least two vehicles each of which is equipped with a VA will park simultaneously or sequentially in a parking area in which at least three GAs are installed and located adjacently. In particular, if a vehicle equipped with a VA desires to be aligned with a GA by using the LF antennas, incorrect position alignment may be performed due to magnetic interferences caused by other vehicles.

The communication between GA and VA may be classified into a single connection scheme or a multiple connection scheme. The above-described problem may occur when the communication scheme of the wireless charging system is the multiple connection scheme. The single connection scheme refers to the communication being performed in a private place where only one GA and one VA exist. On the other hand, the multiple connection scheme may occur when there are multiple GAs in a public place.

The present disclosure proposes a solution of preventing such the problem. More specifically, the present disclosure is directed to providing a method for solving the problem that magnetic field values required for position alignment are distorted and the correct position alignment data are unable to be obtained due to the interferences between magnetic fields of the LF antennas of different vehicles.

The 'different LF antennas' may be understood to refer to both LF antennas having different IDs and using the same resonance frequency and LF antennas using different resonance frequencies. In the current standard, a method of using LF antennas is described as a position alignment method for the EV wireless charging system, but the resonance frequency of the LF antennas for position alignment is not specified.

Figure 8:
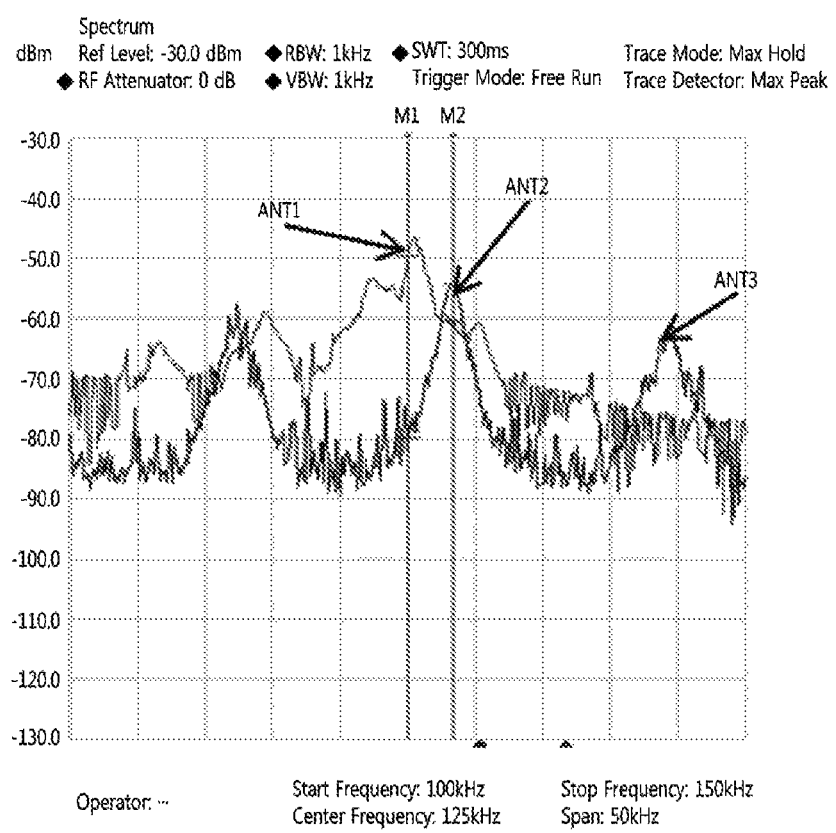
FIG. 8 is a graph illustrating a situation in which magnetic field values are distorted due to magnetic field interference caused by LF antennas of different vehicles during position alignment in an EV wireless charging system according to exemplary embodiments of the present disclosure.

FIG. 8 is a graph illustrating a situation in which magnetic field values are distorted due to magnetic field interference caused by LF antennas of different vehicles during position alignment in an EV wireless charging system.

In FIG. 8, the first LF antenna ANT1 and the second LF antenna ANT2 use the same resonance frequency (e.g., about 125 kHz). As a result, signals of the first LF antenna and the second LF antenna overlap each other and are difficult to distinguish. On the other hand, the third LF antenna ANT3 uses a resonance frequency of about 145 kHz, and thus, the first LF antenna ANT1 and the third LF antenna ANT3 have adjacent resonance frequencies. Although the center frequencies of the two antennas are about 20 kHz apart from each other, the LF antenna used for position alignment in the EV wireless charging system should continuously transmit and receive signals until alignment between GA and VA is completed. Therefore, signal distortion due to magnetic interference may occur.

The EV is required to correctly distinguish the GA as an infrastructure regardless of whether the wireless communication is based on the single connection scheme or the multiple connection scheme. Therefore, the present disclosure provides a method of accurately detecting a wireless charging point through the following exemplary embodiments.

In an exemplary embodiment of the present disclosure, when the position alignment is performed using LF signals, the GA may be configured to transmit a unique identifier (ID) information and unique information for the LF signals of the GA, which are assigned when the GA is installed, to the VA. The unique information for the LF signals of the GA may include an LF collision avoidance signal, an LF ID of the GA (i.e., GA # No), LF antenna information of the GA (i.e., GA # No), and magnetic field detection sensitivity information.

The VA may be configured to synchronize an LF signal thereof (i.e., VA LF signal) with the LF signal of the GA (i.e., GA LF signal) based on the information received from the GA. First, when unique ID information of the GA returned by the VA to the GA via wireless communication is incorrect ID information due to a wireless communication failure or error, the VA may incorrectly detect a wireless charging point. Therefore, the wireless communication association may be performed again.

Additionally, in an exemplary embodiment of the present disclosure, the VA may be configured to compare the unique information of the LF signal through a LF telegram, and perform authentication. The VA may be configured to synchronize with the LF signal transmitted by the GA and then return a LF signal of VA, which is synchronized with the corresponding GA. The GA may be configured to compare the signal received from the VA with the LF collision avoidance signal and detect whether the received signal is the signal transmitted by itself.

If the received signal is identical to the signal transmitted by the GA, the authentication may be determined to be successful, and the next step, which is the alignment step, may be performed. When the received signal is not identical to the signal transmitted by the GA, an authentication failure may be detected, and the wireless communication association step may be repeated.

In particular, the LF collision avoidance signal may be a signal uniquely assigned to each GA when the wireless communication is based on the multiple connection scheme, and the LF collision avoidance signals assigned to the respective GAs may not be the same signal. The meaning of being unique for each GA may be understood to mean, for example, the use or application of a time division multiplexing (TDM) scheme to prevent overlap from occurring between the LF collision avoidance signals for the respective GAs. When the SECC transmits information of the GAs to the EVCC, the SECC may not transmit information of all the GAs at a time. In other words, the SECC may be configured to sequentially transmit information of the respective GAs.

In an exemplary embodiment of the present disclosure, by using the above-mentioned two methods together, it may be possible for an EV to correctly distinguish the GA, which is the infrastructure, in the EV wireless charging system.

Second, when the wireless communication in the EV wireless charging system is based on the multiple connection scheme, a plurality of EVs may simultaneously approach a GA for wireless charging thus causing magnetic field interference between LF signals. Accordingly, the SECC may configure an order of EVCCs of the EVs, assign a priority to the EVCC which accesses the SECC first, and operate the EVCC to access the GA. In this manner, it may be to prevent the collision problem that occurs when a plurality of EVs approach the GA at the same time and the distortion of the position alignment data due to the magnetic field interference of the LF signals.

For the vehicle to distinguish the respective GAs, an LF telegram may be used. In an exemplary embodiment of the present disclosure, the magnetic field may be prevented from being distorted by providing a notification indicating that a preceding vehicle is entering and specifying an order of a trailing vehicle via a WLAN. This method may be more suitable for a case of remote parking than a case when a driver manually parks the vehicle.

Figure 9:
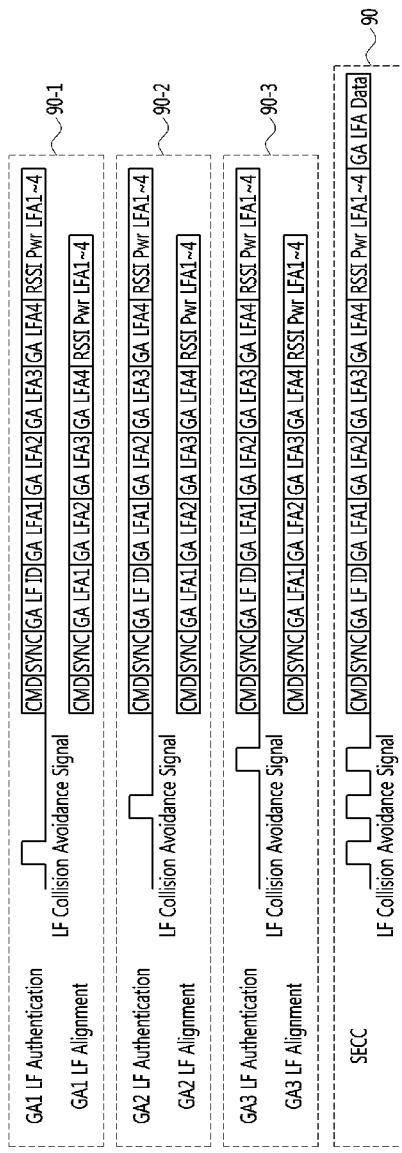
FIG. 9 is a diagram illustrating a detailed configuration of an LF telegram of a GA according to an exemplary embodiment of the present disclosure.

FIG. 9 is a diagram illustrating a detailed configuration of an LF telegram of a GA according to an exemplary embodiment of the present disclosure. In FIG. 9, LF telegrams 90-1 of a GA1, LF telegrams 90-2 of a GA2, and LF telegrams 90-3 of a GA3 are shown, and at the bottom, a form of an LF telegram 90 for all of the GAs from the SECC perspective is shown. The LF telegram may refer to a series of signals including information regarding the LF collision avoidance signal as well as the unique information of the GA and the VA.

As shown in FIG. 9, the LF signals for the respective GAs may be adjusted to prevent overlap over time. The LF telegrams for the respective GAs may be classified into a telegram for LF authentication and a telegram for LF alignment. The telegram for LF authentication for each GA may include a command (CMD), a sync (SYNC), a GA LF ID, LF antenna information (i.e., GA LFA1, GA LFA2, GA LFA3, and GA LFA4), and magnetic field detection sensitivity information (RSSI Pwr LFA1~4).

The telegram for LF alignment for each GA may include a command (CMD), a sync (SYNC), LF antenna information (i.e., GA LFA1, GA LFA2, GA LFA3, and GA LFA4), and magnetic field detection sensitivity information (RSSI Pwr LFA1-4). In particular, the CMD may operate as a header in wireless communication, and the SYNC is a field for synchronizing with a periodicity based on a clock signal for transmission through a most significant bit (MSB) in the LF telegram having a serial peripheral interface (SPI) structure.

Figure 10:
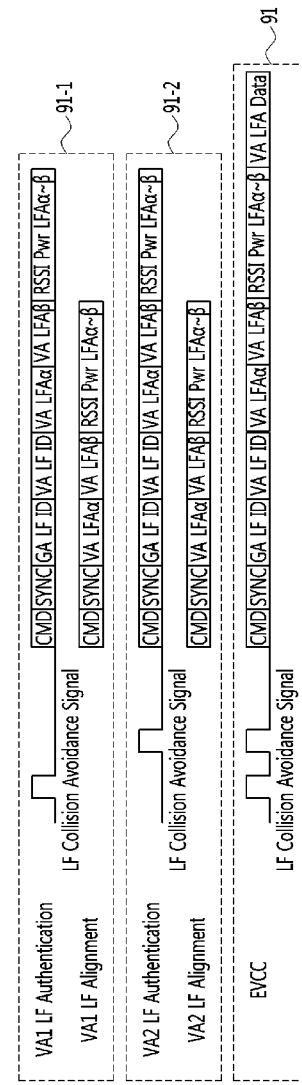
FIG. 10 is a diagram illustrating a detailed configuration of an LF telegram of a VA according to an exemplary embodiment of the present disclosure.

FIG. 10 is a diagram illustrating a detailed configuration of an LF telegram of a VA according to an exemplary embodiment of the present disclosure. According to an exemplary embodiment of the present disclosure, a VA may be configured to generate LF magnetic fields for position alignment. In FIG. 10, LF telegrams 91-1 of a VA1 and LF telegrams 91-2 of a VA2 are shown, and at the bottom, a form of an LF telegram 91 for all of the VAs from the EVCC perspective is shown.

As shown in FIG. 10, the LF signals for the respective VAs may be adjusted to prevent overlap over time. The LF telegrams for the respective VAs may be classified into a telegram for LF authentication and a telegram for LF alignment, similarly to the case of the GA. The telegram for LF authentication for each VA may include a command (CMD), a SYNC, a GA LF ID, a VA LF ID, LF antenna information (i.e., VA LFA$\alpha$, and VA LFA$\beta$), and magnetic field related information (i.e., RSSI Pwr LFA$\alpha$~$\beta$).

Since the VA should perform synchronization based on the information of the GA and return the corresponding information to the GA (i.e., the VA should configure its LF information so as to use the LF congestion avoidance signal used by the selected GA), it may be confirmed that the LF telegram of the VA for authentication includes the GA synchronization information (GA LF ID). The telegram for LF authentication for each GA may include a command (CMD), a SYNC, LF antenna information (i.e., VA LFA$\alpha$, and VA$\beta$), and magnetic field related information (i.e., RSSI Pwr LFA$\alpha$~$\beta$).

Figure 11:
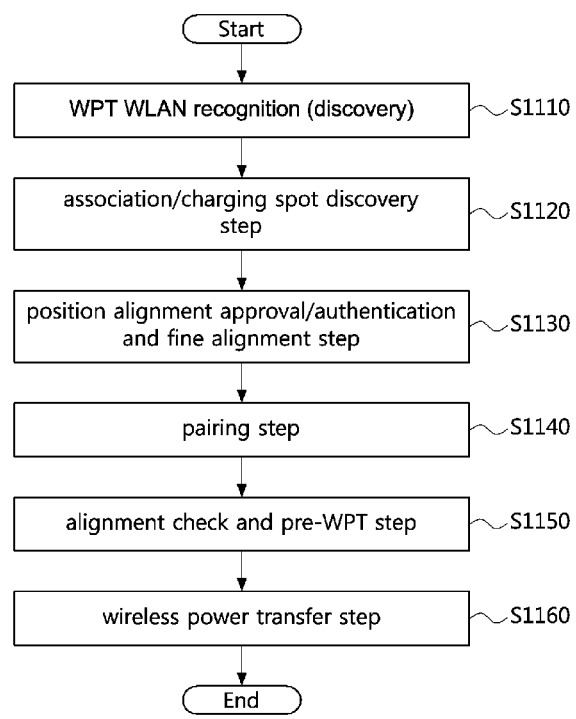
FIG. 11 is a diagram illustrating an overall operation flow of a wireless charging method including position alignment according to an exemplary embodiment of the present disclosure.

FIG. 11 is a diagram illustrating an overall operation flow of a wireless charging method including position alignment according to an exemplary embodiment of the present disclosure. The wireless charging method shown in FIG. 11 may be performed by a VA (or EVCC) and a GA (or SECC), and may include a WPT WLAN recognition (discovery) step S1110, an association and charging spot discovery step S1120, a position alignment approval, authentication, and position alignment performing (fine alignment) step S1130, a pairing step S1140, an alignment check and pre-WPT step S1150, and a wireless power transfer step S1160.

In particular, a position alignment method viewed from a VA side may include identifying states of a plurality of GAs via wireless communication with an SECC configured to operate the plurality of GAs, receiving from the SECC information regarding one or more available GAs among the plurality of GAs, selecting a target GA based on the information regarding the one or more available GAs and performing a wireless communication association with the target GA, performing a procedure for position alignment approval and a procedure for authentication by requesting to the SECC, and in response to determining that the authentication is successful, performing position alignment with the target GA using LF signals.

The LF signal assigned to each GA may be distinguished from LF signals assigned to other GAs in a TDM scheme. On the other hand, a position alignment method viewed from an SECC side may include providing information regarding states of one or more available GAs to an EV entering into a wireless communication region of the SECC, performing a wireless communication association between an EVCC of the EV and a target GA selected by the EV among the one or more available GAs, performing a procedure for position alignment approval and a procedure for authentication with the EV and the target GA according to a request of the EVCC, and in response to determining that the authentication is successful, performing position alignment between the EV and the target GA using LF signals.

Hereinafter, the position alignment method for wireless charging according to the present disclosure will be described in detail with reference to exemplary embodiments. In the exemplary embodiments, it may be assumed that multiple communications between the GA and the VA are configured as shown in FIG. 7, and that at least two vehicles each of which is equipped with a VA will park in a parking area in which a plurality of GAs of an EV wireless charging system are installed (i.e., a parking area in which at least three GAs are installed and located adjacently).

Figure 12:
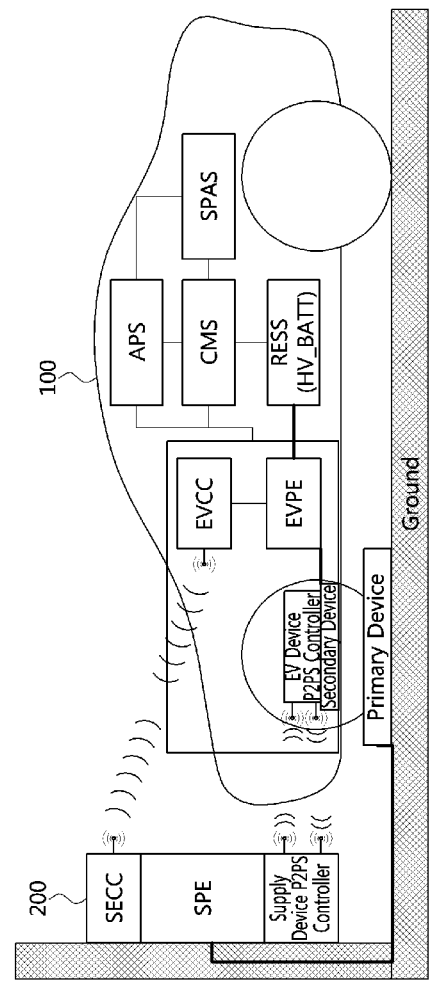
FIG. 12 is a block diagram illustrating a GA and a VA for performing a position alignment method according to exemplary embodiments of the present disclosure.

FIG. 12 is a block diagram illustrating a GA and a VA for performing a position alignment method according to exemplary embodiments of the present disclosure. Specifically, FIG. 12 illustrates blocks included in a vehicle and a power supply equipment, which are necessary for wireless charging. The VA 100 may include an EVCC, an EV power electronics (EVPE), and an EV device point-to-point signal (P2PS) controller. The EVCC, the EVPE, and the EV device P2PS controller may be implemented as one apparatus or hardware. In particular, the one apparatus may be a position alignment apparatus configured to perform position alignment with a target GA among a plurality of GAs, and may be implemented as including at least one processor and a memory in which at least one instruction executable by the at least one processor is stored.

The at least one instruction may instruct the at least one processor to perform identifying states of a plurality of GAs through wireless communication with an SECC configured to operate the plurality of GAs, receiving from the SECC information regarding one or more available GAs among the plurality of GAs, selecting a target GA based on the information regarding the one or more available GAs and performing a wireless communication association with the target GA, performing a procedure for position alignment approval and a procedure for authentication by requesting to the SECC, and in response to determining that the authentication is successful, performing position alignment with the target GA using LF signals. The LF signal assigned to each GA may be distinguished from LF signals assigned to other GAs in a TDM scheme.

The at least one processor may be a central processing unit (CPU), a graphics processing unit (GPU), or a dedicated processor on which methods in accordance with the exemplary embodiments of the present disclosure are performed. The memory may include at least one of a volatile storage medium and a nonvolatile storage medium. For example, the memory may comprise at least one of a read only memory (ROM) and a random access memory (RAM).

The GA 200 of the charging station side may include an SECC, a supply power electronics (SPE), a supply device point-to-point signal (P2PS) controller, and a supply device. In particular, the SECC, the SPE, and the supply device P2PS controllers may be implemented as one apparatus or hardware. The one apparatus may be a position alignment control apparatus, and may be implemented as including at least one processor and a memory in which at least one instruction executable by the at least one processor is stored.

Meanwhile, the SECC and the EVCC may be configured to transmit and receive position alignment related information according to the present disclosure via a WLAN. The EV device P2PS controller and the supply device P2PS controller may be configured to exchange position alignment related information according to the present disclosure via the WLAN or the LF signals.

The at least one processor may be a CPU, a GPU, or a dedicated processor on which methods in accordance with the exemplary embodiments of the present disclosure are performed. The memory may include at least one of a volatile storage medium and a nonvolatile storage medium. For example, the memory may include at least one of a ROM and a RAM.

Hereinafter, in the description of the position alignment method according to the present disclosure, the EV, the VA, and the EVCC may be used interchangeably in the same sense as the entity of performing the position alignment method on the vehicle side for convenience of explanation. Additionally, the EVSE, the GA, and the SECC may be used interchangeably in the same sense as the entity of performing the position alignment method on the charging station or power supply side.

Figure 13:
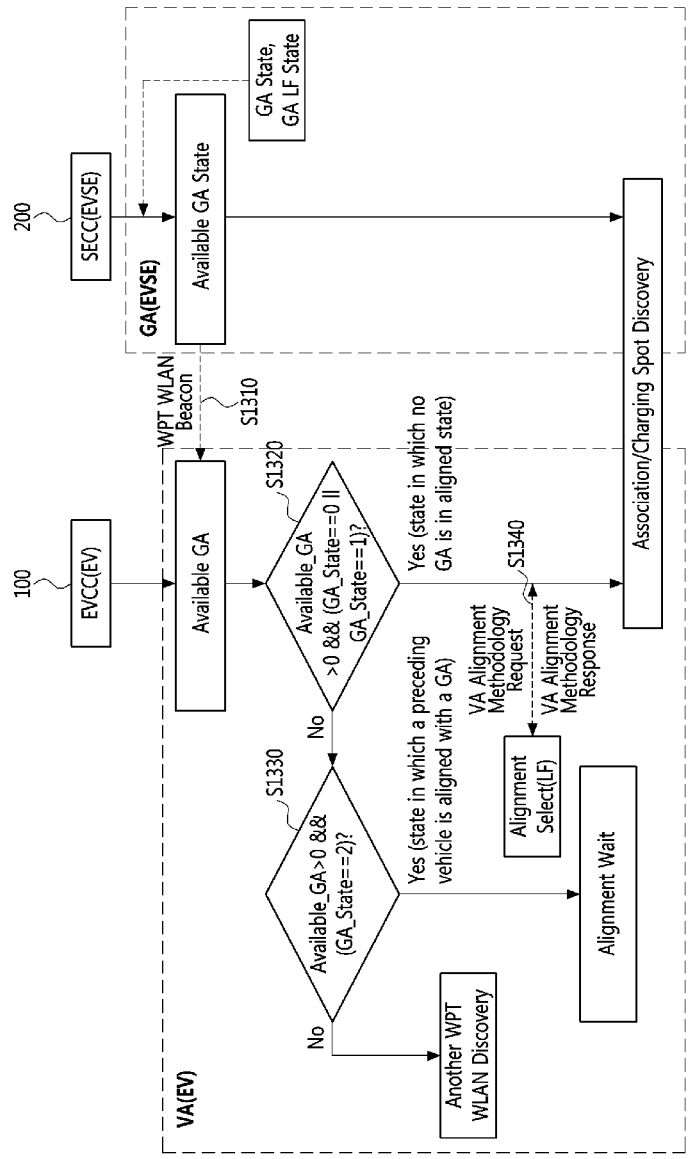
FIG. 13 is a diagram illustrating an example of an operation flow in a wireless communication discovery step in a position alignment method according to an exemplary embodiment of the present disclosure.

FIG. 13 is a diagram illustrating an example of an operation flow in a wireless communication discovery step in a position alignment method according to an exemplary embodiment of the present disclosure. The exemplary embodiment shown in FIG. 13 corresponds to an exemplary embodiment in which the SECC 200 discovers the EVCC 100. In the corresponding exemplary embodiment, the SECC may first provide information regarding states of a plurality of GAs (i.e., GA state information) to the EVCC.

The EVCC (or, charging management system (CMS)) of the EV may be configured to receive the GA state information from the SECC (i.e., central WLAN) of the EVSE via, for example, a WPT WLAN beacon frame (S1310). The GA state information may include information such as whether each GA is available for wireless charging, whether each GA is in a fault state, and information indicating that LF antennas are used for position alignment. In response to receiving the GA state information, the EVCC 100 may be configured to detect whether there is an available GA and whether a GA_State message of the available GA indicates a normal state or a charging state based on the information received from the SECC of the EVSE (S1310). As a result, only when the GA_State indicates the normal state or the charging state (i.e., GA_State=0 or GA_State=1), the EVCC may proceed to the association/charging spot discovery step. The GA state at this time may be a state in no GA is in aligned state.

When an available GA is detected as a result of detecting the GA state, but the GA_State message of the corresponding GA indicates an aligned state (i.e., GA_State=2), the EVCC of the EV may proceed to an alignment wait state. In other words, in this case, for example, the preceding vehicle may be detected and the preceding vehicle may be in aligned state with the GA.

Meanwhile, the EVCC 100 of the EV may request information regarding the position alignment scheme to the CMS of the EV using an in-vehicle network (e.g., CAN, Ethernet, or the like), and may be configured to receive, from the CMS of the EV, a signal or information indicating that the LF-based position alignment is to be used (S1340). As a result of detecting the GA state, if the GA_State message indicates a failure, the EV may move to receive other wireless communication information for wireless charging (i.e., another WPT WLAN discovery).

FIG. 14 is a diagram illustrating another example of an operation flow in a wireless communication discovery step in a position alignment method according to an exemplary embodiment of the present disclosure.

The exemplary embodiment shown in FIG. 14 corresponds to an exemplary embodiment in which the EVCC 100 discovers the SECC 200. In the corresponding exemplary embodiment, the EVCC of the EV may be configured to first request wireless charging information to the SECC (i.e., central WLAN) of the EVSE (e.g., through a WPT WLAN probe request frame) (S1410), and receive the wireless charging information from the SECC of the EVSE (e.g., through a WPT LAN probe response frame) (S1411).

In response to receiving the GA state information, the EVCC 100 may be configured to detect whether there is an available GA and whether a GA_State message of the available GA indicates a normal state or a charging state based on the information received from the SECC of the EVSE (S1420). As a result, only when the GA_State indicates the normal state or the charging state (i.e., GA_State==0 or GA_State==1), the EVCC may proceed to the association/charging spot discovery step. The GA state at this time may be a state in which no GA is in aligned state.

When an available GA is detected as a result of detecting the GA state, but the GA_State message of the corresponding GA indicates an aligned state (i.e., GA_State==2), the EVCC of the EV may proceed to an alignment wait state. In other words, in this case, for example, the preceding vehicle may be detected and the preceding vehicle may be in aligned state with the GA.

As a result of detecting the GA state, if the GA_State message indicates a failure, the EV may move to receive other wireless communication information for wireless charging (i.e., another WPT WLAN discovery). Meanwhile, the EVCC 100 of the EV may be configured to request information regarding the position alignment scheme to the CMS of the EV using an in-vehicle network (e.g., CAN, Ethernet, or the like), and may be configured to receive, from the CMS of the EV, a signal or information indicating that the LF-based position alignment is to be used (S1440).

Figure 15A:
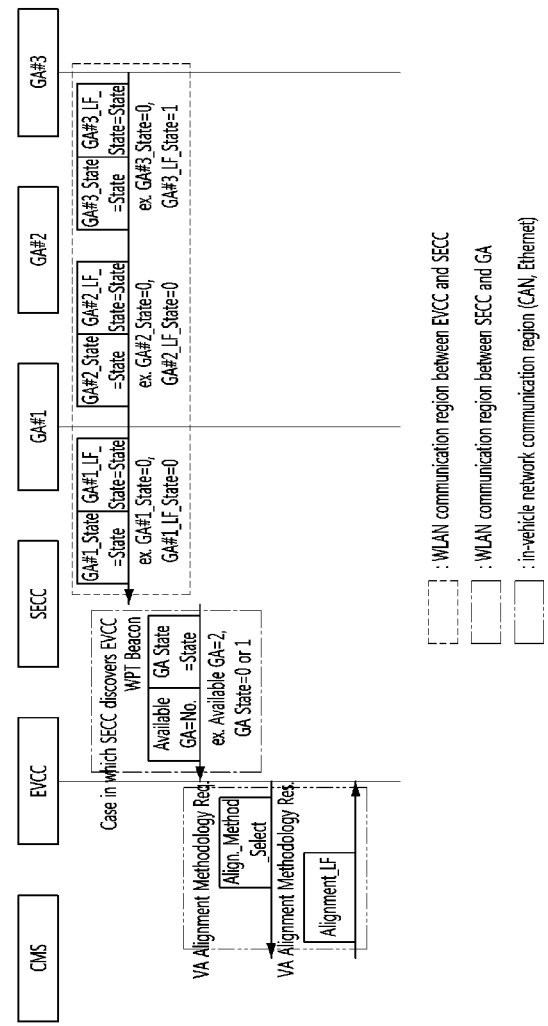
FIG. 15A and FIG. 15B illustrate examples of a detailed message flow transferred between components performing relevant operations in a wireless communication discovery step in a position alignment method according to an exemplary embodiment of the present disclosure.
Figure 15B:
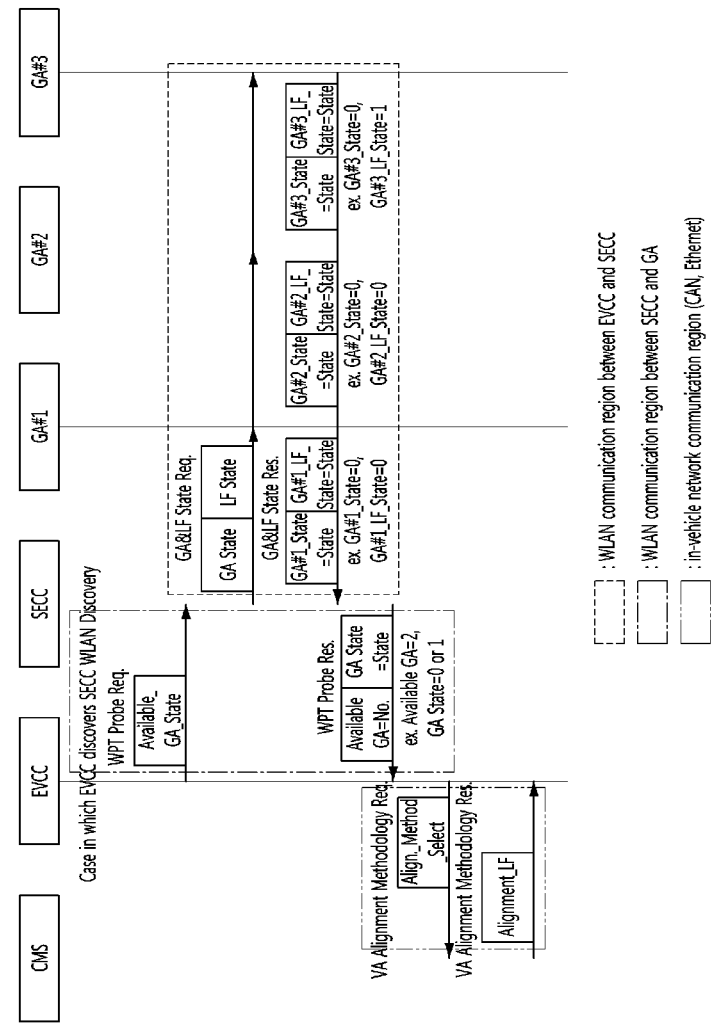

FIG. 15A and FIG. 15B illustrate examples of a detailed message flow transferred between components performing relevant operations in a wireless communication discovery step in a position alignment method according to an exemplary embodiment of the present disclosure.

In FIGS. 15A and 15B, examples of a case in which the GA_State message among the information received from the SECC of the EVSE indicates the normal state or the charging state, i.e., a case in which no GA is in aligned state, may be illustrated. Specifically, FIG. 15A illustrates a WLAN discovery procedure when the SECC discovers the EVCC, and FIG. 15B illustrates a WLAN discovery procedure when the EVCC discovers the SECC.

Figure 15C:
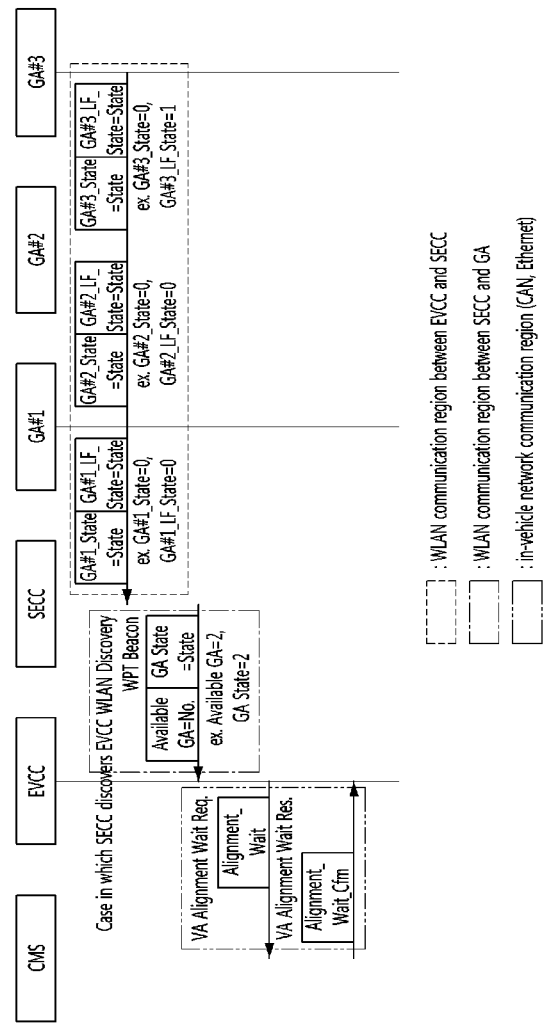
FIG. 15C and FIG. 15D illustrate examples of a detailed message flow transferred between components performing relevant operations in a wireless communication discovery step in a position alignment method according to another exemplary embodiment of the present disclosure.
Figure 15D:
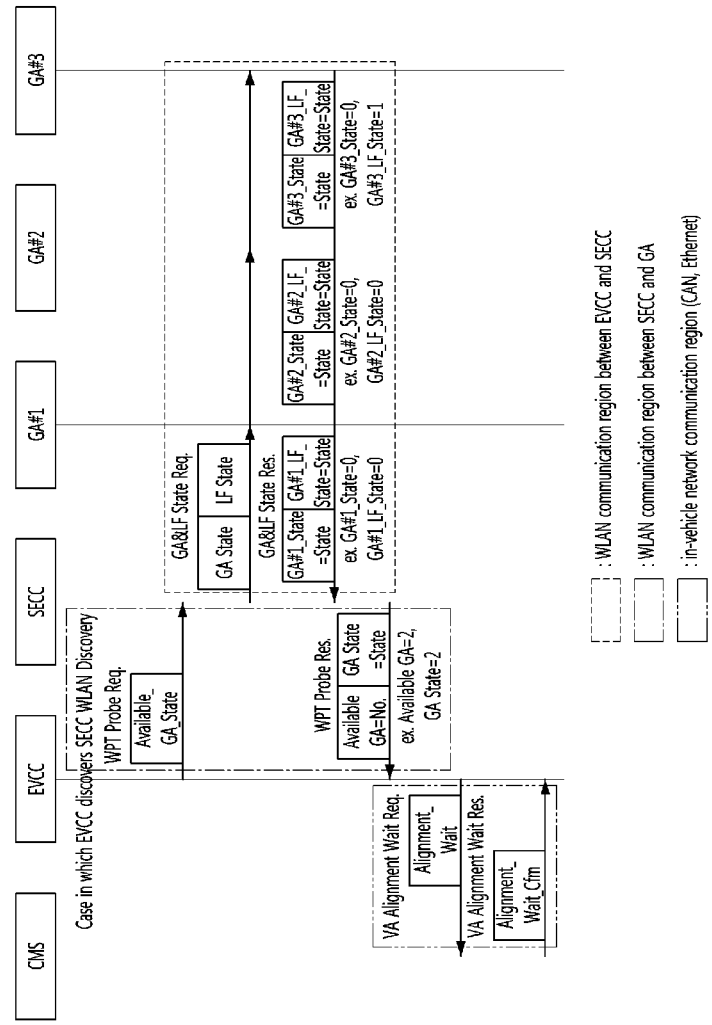

FIG. 15C and FIG. 15D illustrate examples of a detailed message flow transferred between components performing relevant operations in a wireless communication discovery step in a position alignment method according to another exemplary embodiment of the present disclosure.

FIGS. 15C and 15D illustrate, in detail, signals or messages exchanged between the EVCC and the SECC or between internal components thereof in a WLAN discovery procedure when the GA_State message among the information received from the SECC of the EVSE indicates the aligned state (e.g., when a preceding vehicle exists and is in aligned state with the corresponding GA). Specifically, FIG. 15C illustrates a WLAN discovery procedure when the SECC discovers the EVCC, and FIG. 15D illustrates a WLAN discovery procedure when the EVCC discovers the SECC.

Figure 16A:
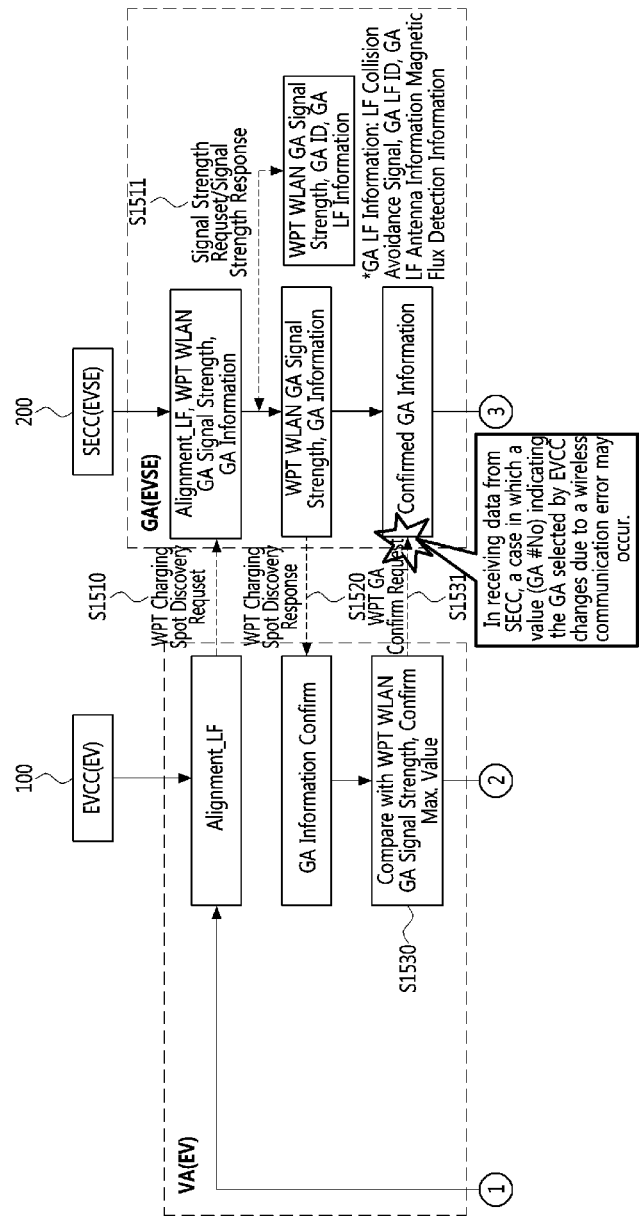
FIG. 16A and FIG. 16B illustrate an example of an operation flow in a wireless communication association step in a position alignment method according to an exemplary embodiment of the present disclosure.
Figure 16B:
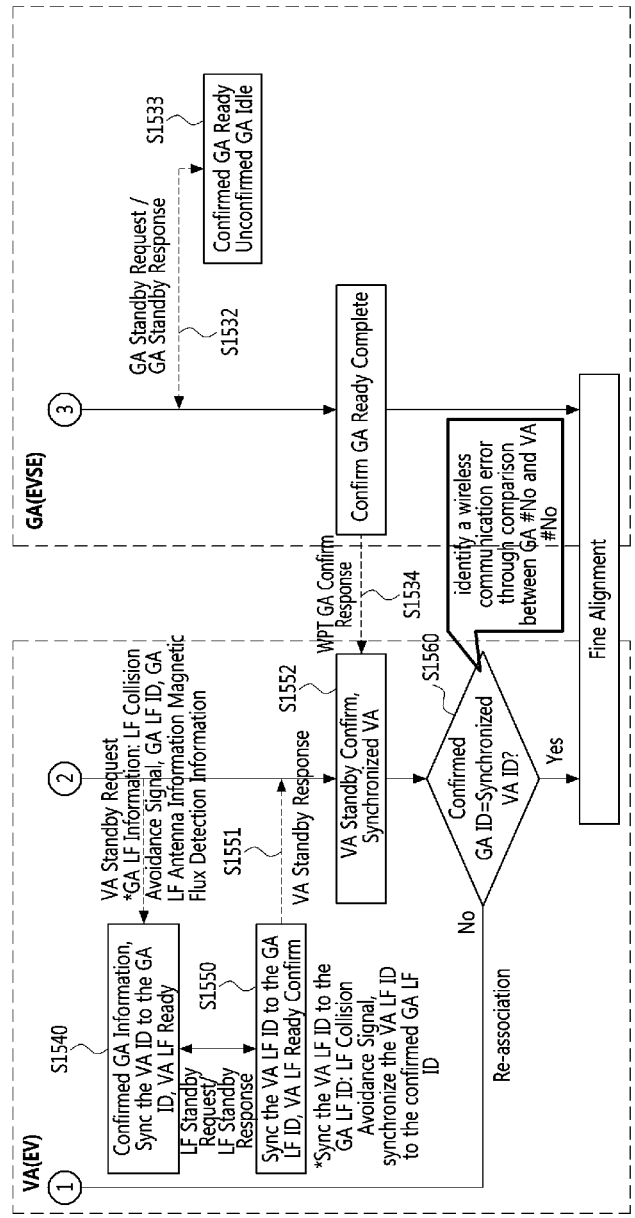

FIG. 16A and FIG. 16B illustrate an example of an operation flow in a wireless communication association step in a position alignment method according to an exemplary embodiment of the present disclosure. The EVCC 100 and the SECC 200 that have completed the wireless communication discovery step may proceed to the wireless communication association step or the charging spot discovery step.

As shown in FIG. 16A, for the wireless communication association, the EVCC of the EV may be configured to transmit a communication association request (or, a WPT charging spot discovery request) to the SECC of the EVSE (S1510). In particular, the EVCC may be configured to transmit information indicating that the LF-based position alignment scheme is to be used in the vehicle as included in the request.

The SECC 200 of the EVSE receiving the communication association request may be configured to request information regarding a wireless signal strength of a GA to each GA, and receive the requested information (S1511). The information provided by the GA to the SECC may include the GA ID and information regarding an LF system, as well as the wireless signal maximum strength value of the GA. In other words, each GA managed by the SECC may be configured to transmit the maximum strength of the wireless signal, the GA ID, and the GA LF information of the corresponding GA to the SECC. In particular, each LF system unique information may include an LF collision avoidance signal, an LF ID of the corresponding GA (i.e., GA # No), LF antenna information of the corresponding GA (i.e., GA # No), magnetic field detection sensitivity information, and the like.

The SECC 200 may be configured to provide information regarding at least one GA under the operation of the SECC to the EVCC (S1520). The EVCC 100 may be configured to receive the information regarding at least one GA from the SECC, compare the strengths of the wireless signals of the GAs when there are a plurality of GAs, and select a GA having a highest wireless signal strength (S1530). The EVCC 100 may be configured to inform the SECC of the EVSE of the selected GA (i.e., GA # No) (S1531).

The SECC of the EVSE may be configured to receive the information regarding the selected GA, and inform each GA of the GA # No of the selected GA (S1532). The selected GA may enter an alignment-ready state, and the unselected GA(s) may enter a standby state for charging with the next vehicle (S1533). When the preparation for alignment is completed in the selected GA, the SECC may be configured to output a notification to the EVCC of the EV (S1534).

Meanwhile, after the EVCC selects the GA having the maximum signal strength (S1530), the EVCC may be configured to assign a value equal to the selected GA # No as a VA # No based on the selected GA (i.e., GA # No) (S1540), and output a notification to the CMS of the EV of the assigned VA # No. In particular, the EVCC may also be configured to transmit to the CMS of the VE the information regarding the LF of the selected GA (i.e., GA # No._LF_Info) together. The CMS of the EV that receives the information may be configured to transmit to the APS of the EV the LF information of the GA (GA # No. LF_Info) to allow the APS to prepare authentication on the LF system between the GA and the VA. The information regarding the LF of the GA may include an LF collision avoidance signal, a GA LF ID, GA LF antenna information, magnetic field detection sensitivity information, and the like.

The APS of the EV may modify the LF information thereof based on the LF information of the selected GA (S1550). The information that the EV modifies may include the LF collision avoidance signal, the SYNC, and the VA LF ID. The CMS of the EV may be configured to receive the modified LF information from the APS of the EV and information indicating that the APS is ready for position alignment, and transmit the information to the EVCC (S1551). The EVCC may be configured to receive, from the CMS of the EV, the LF initial information received from the APS of the EV and information confirming the VA # No assigned by the EVCC of the EV (S1552).

Additionally, the EVCC of the EV may be configured to compare the GA ID (i.e., GA Rdy) returned from the SECC through a WPT GA confirm response and the GA ID (i.e., GA Cfm) processed and transmitted through the APS and the CMS, i.e., the synchronized VA ID (S1560). Since data may be changed due to a wireless communication error when the GA ID selected by EVCC is transmitted to the SECC, through the comparison process, the wireless communication error may be detected, and accordingly, alignment to an incorrect GA due to the wireless communication error may be prevented.

As a result of the comparison, when the GA ID returned through the WPT GA confirm response and the GA ID transferred to the SECC are the same, the position alignment step, which is the next step, may be performed. On the other hand, if the GA ID returned through the WPT GA confirm response is different from the GA ID transferred to the SECC, the wireless communication reassociation step (charging spot rediscovery) may be performed.

Figure 17A:
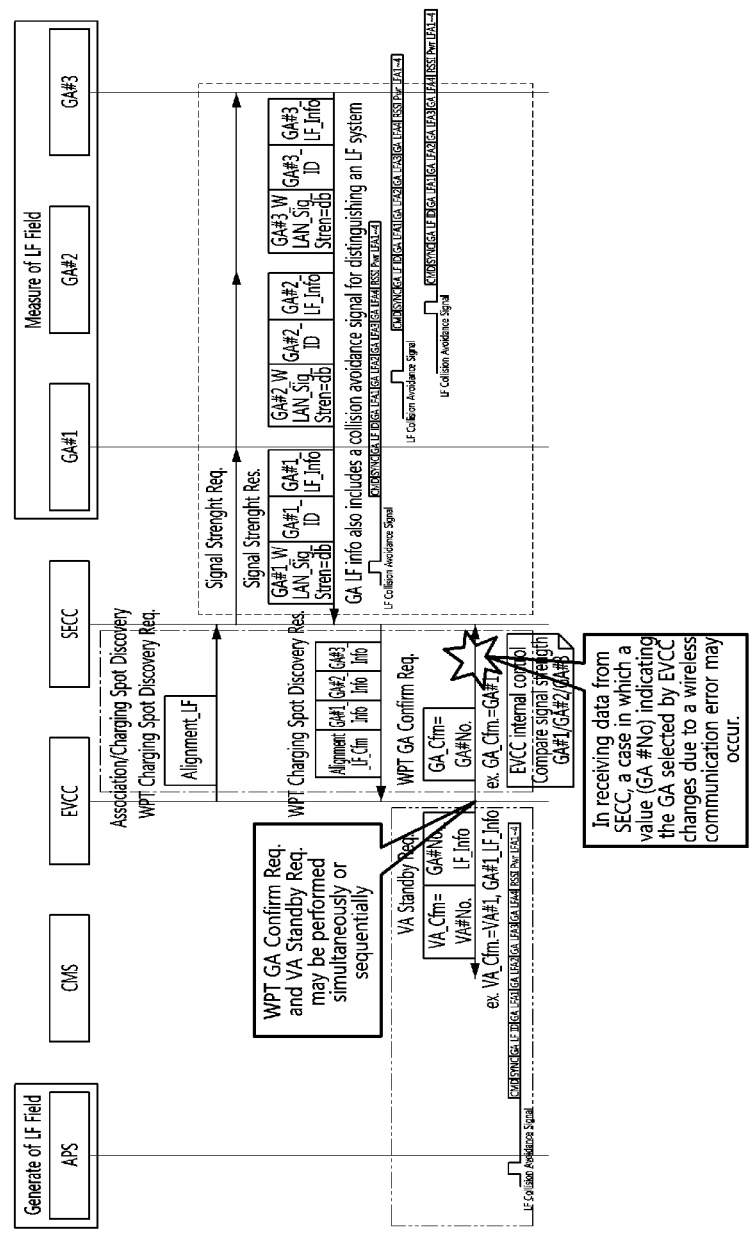
FIG. 17A and FIG. 17B illustrate an example of a detailed message flow transferred between components performing relevant operations in a wireless communication association step in a position alignment method according to an exemplary embodiment of the present disclosure.
Figure 17B:
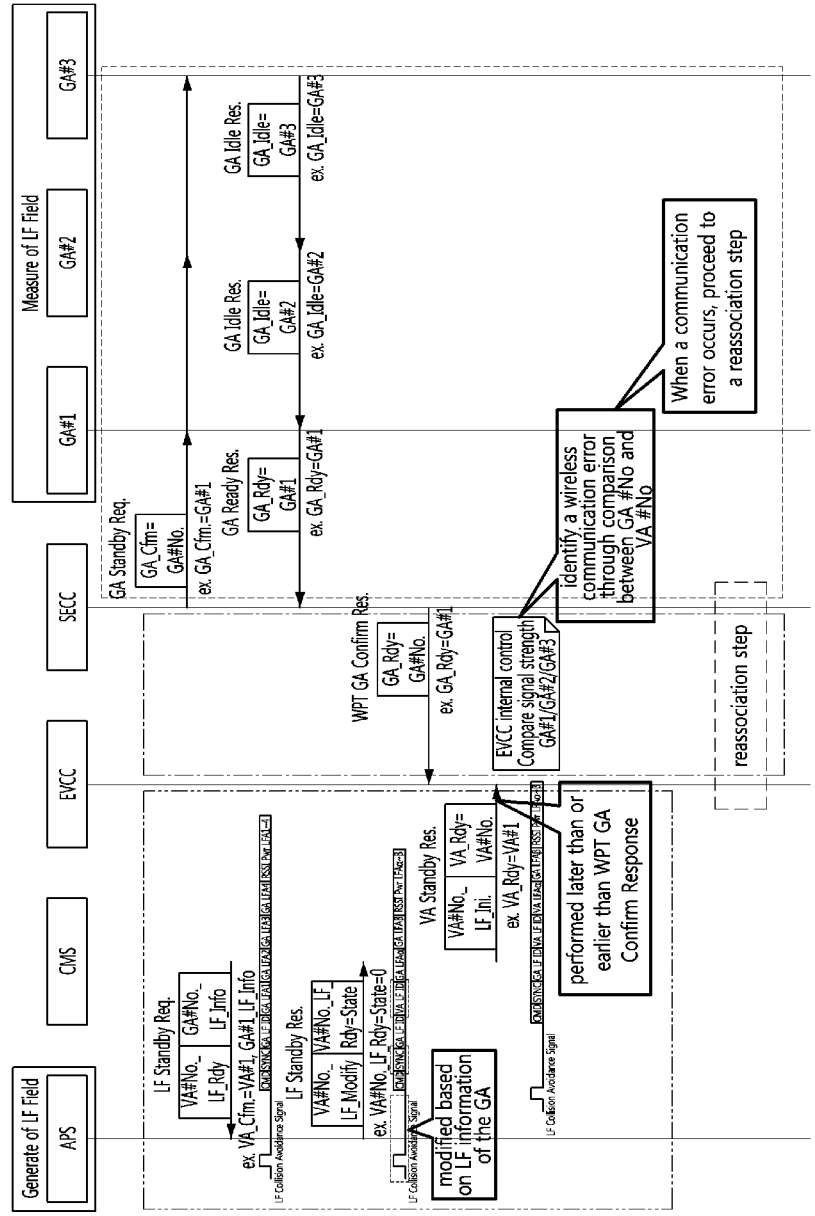

FIG. 17A and FIG. 17B illustrate an example of a detailed message flow transferred between components performing relevant operations in a wireless communication association step in a position alignment method according to an exemplary embodiment of the present disclosure. In FIG. 17A, details of GA LF information provided by each GA to the SECC at the request of the SECC, that is, a form of an LF telegram, may be identified.

As shown in FIGS. 17A and 17B, in the wireless communication association step, when the number of the GA selected by the EVCC does not match the number of the corresponding GA stored therein, the SECC may be configured to detect an error or failure in the wireless communication through which data transmission and reception are performed. Additionally, the EVCC may be configured to determine whether a wireless communication error occurs by comparing the GA ID (i.e., GA Rdy) returned from the SECC with the GA ID (i.e., GA Cfm) processed and transmitted internally in the EVCC, that is, the synchronized VA ID. When a wireless communication error occurs, a wireless communication reassociation procedure may be performed. In addition, the APS of the EV may determine that the LF collision avoidance signal, the SYNC, and the VA LF ID of the LF information of the VA are modified based on the LF information of the selected GA.

Figure 18A:
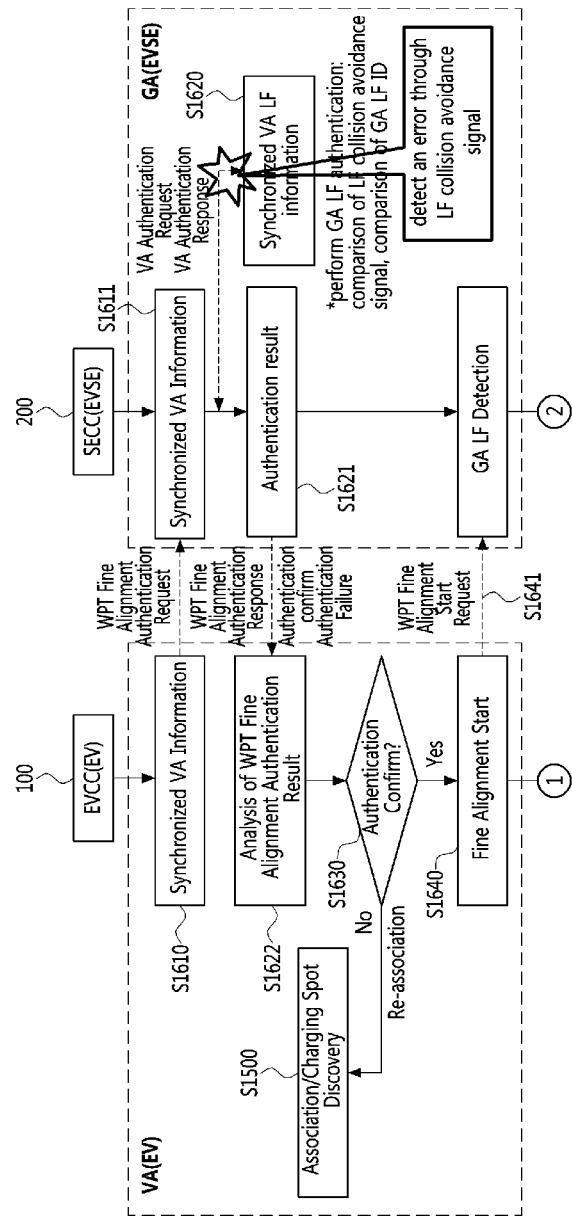
FIG. 18A and FIG. 18B illustrate an example of an operation flow in a position alignment approval, authentication, and position alignment performing step for position alignment in a position alignment method according to an exemplary embodiment the present disclosure.
Figure 18B:
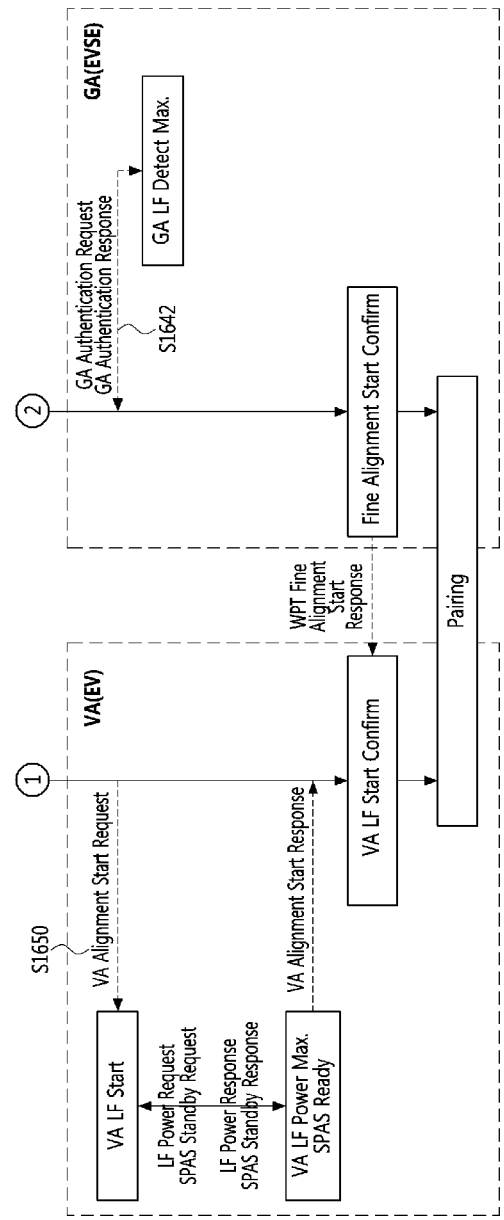

FIG. 18A and FIG. 18B illustrate an example of an operation flow in a position alignment approval, authentication, and position alignment performing step for position alignment in a position alignment method according to an exemplary embodiment the present disclosure.

To perform position alignment, the EVCC of the EV may be configured to transmit LF initial information of the VA # No to the SECC of the EVSE (S1610). The SECC of the EVSE may be configured to transfer the LF initial information of the VA to a target GA that is ready for charging (S1611). The GA receiving the LF initial information of the VA may be configured to perform authentication on the LF system before alignment by comparing the information (GA # No._LF_Info) transmitted therefrom in the wireless communication association step (charging spot discovery) with the LF initial information of the VA (S1620).

In particular, when performing the authentication, the GA may be configured to detect information that may include whether the LF collision avoidance signals match, whether the GA LF IDs match, and the like. If the information matches, the GA may be configured to output a return signal indicating that the authentication is successful to the SECC (S1621). If the corresponding information is not matched, an error may be determined. Therefore, the GA may be configured to output a return signal indicating that the authentication of the LF system is failed to the SECC (S1621).

The EVCC of the EV may be configured to receive from the SECC of the EVSE the authentication result of the LF system received by the SECC of the EVSE from the target GA, and analyze the result of the authentication result of the LF system (S1622). If a signal indicating successful authentication of the LF system is identified (S1630), the EVCC may proceed to a position alignment start step (S1640). On the other hand, if a signal indicating a failure of the authentication of the LF system is identified, the EVCC of the EV may proceed to the reassociation step (charging spot rediscovery) (S1500).

Meanwhile, when the authentication is successful, the EVCC of the EV may be configured to transmit a position alignment start signal to the SECC of the EVSE (S1641). The SECC of the EVSE may be configured to request the GA to set a detection power (e.g., magnetic field detection sensitivity) of the LF antenna to the maximum (S1642). In response to receiving the request, the GA may be configured to set the detection power of the LF antenna to the maximum and notify the SECC that the LF antenna detection power is maximized.

After the authentication succeeds and the position alignment starts, the EVCC may be configured to transmit a position alignment start signal to the CMS of the EV (S1650). The CMS of the EV may be configured to request the APS of the EV to maximize a magnetic field output of the LF antenna. The APS of the EV may be configured to set the magnetic field output of the LF antenna to the maximum.

Additionally, the CMS of the EV may be configured to request a smart parking assistance system (SPAS) to prepare for position alignment. The APS of the EV may maximize the magnetic field output of the LF antenna, and provide a notification related thereto to the CMS of the EV. The CMS of the EV may be informed that the alignment of the EV is ready from the SPAS. The CMS may be configured to provide a notification related thereto to the EVCC, and the EVCC may be configured to identify that the alignment with the SECC is approved and perform the alignment.

Figure 19A:
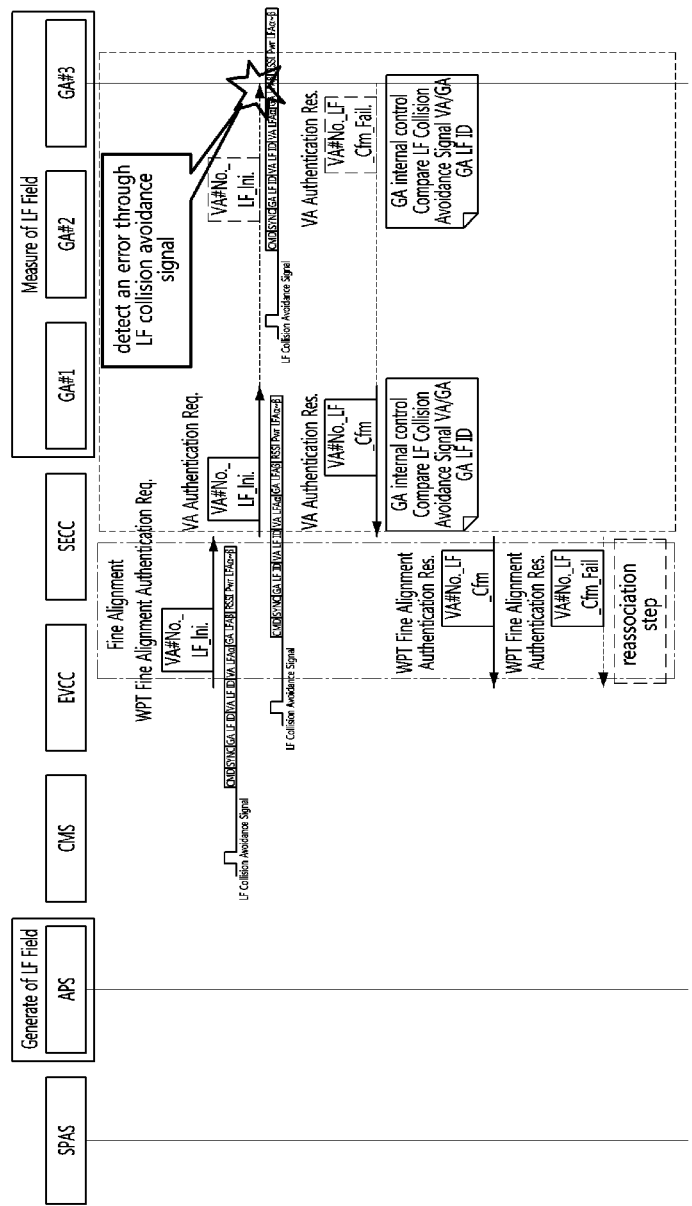
FIG. 19A and FIG. 19B illustrate an example of a detailed message flow transferred between components performing relevant operations in a position alignment approval, authentication, and position alignment performing step for position alignment in a position alignment method according to an exemplary embodiment of the present disclosure.
Figure 19B:
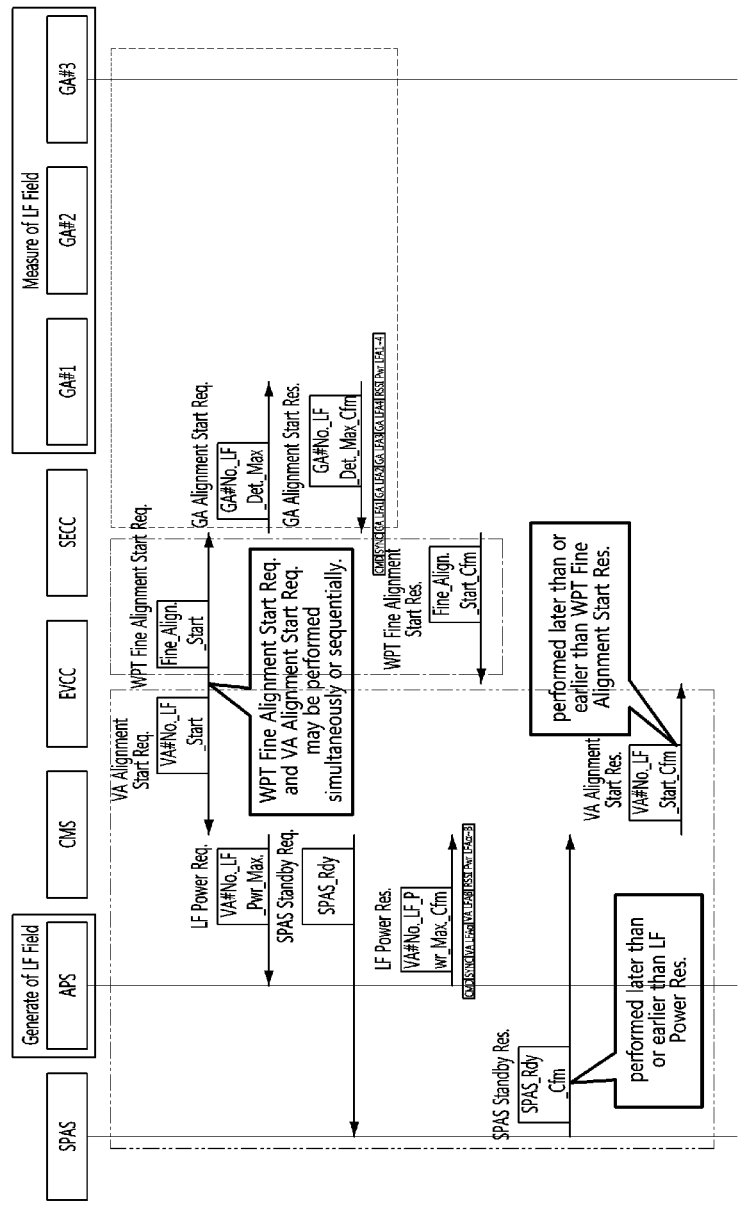

FIG. 19A and FIG. 19B illustrate an example of a detailed message flow transferred between components performing relevant operations in a position alignment approval, authentication, and position alignment performing step for position alignment in a position alignment method according to an exemplary embodiment of the present disclosure.

In FIG. 19A, the GA receiving the LF initial information of the VA may be configured to perform authentication on the LF system before alignment by comparing the information (GA # No._LF_Info) transmitted by therefrom in the wireless communication association step (charging spot discovery) with the LF initial information of the VA. The GA may be configured to determine whether the LF collision avoidance signals match when the authentication is performed.

Figure 20:
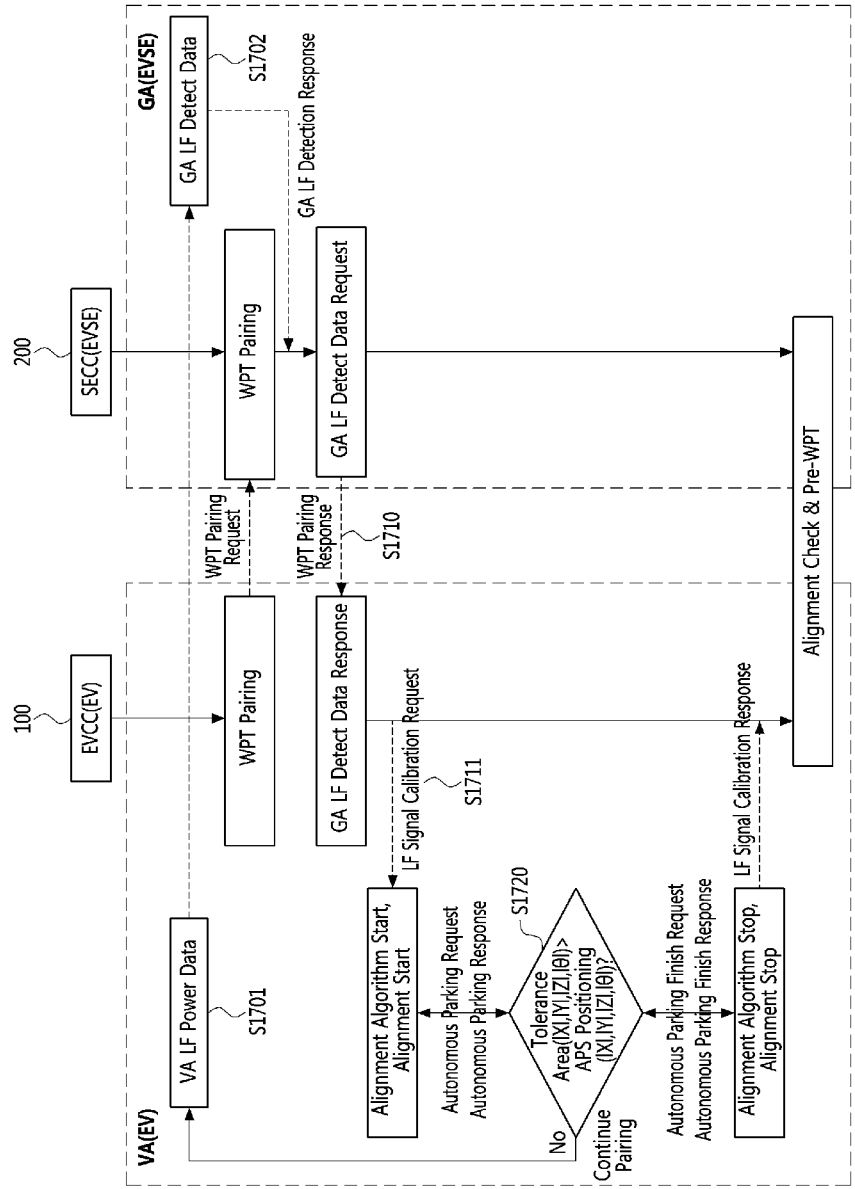
FIG. 20 illustrates an example of an operation flow in a pairing step of a position alignment method according to an exemplary embodiment of the present disclosure.

FIG. 20 illustrates an example of an operation flow in a pairing step of a position alignment method according to an exemplary embodiment of the present disclosure. The LF antenna magnetic field output adjusted by the APS of the EV may be detected by the LF antenna of the GA of the EVSE (S1702). The SECC may be configured to analyze detected magnetic field values, and transmit the analyzed values to the EVCC of the EV using wireless communication (S1710).

The EVCC of the EV may be configured to transmit the analyzed magnetic field strengths to the APS of the EV via the CMS of the EV (S1711). The APS of the EV may be configured to calculate information (X, Y, Z, θ) about coordinates of the VA of the vehicle and the GA, and the deviation of the vehicle using a position estimation algorithm (e.g., RSSI, TOF, TODF, etc.), and provide basic information necessary for automatic parking to the automatic parking system. On the other hand, the SPAS of the EV may be configured to repeatedly perform operations until the coordinate received from the APS of the EV reaches a particular threshold (e.g., a tolerance area specified by a standard) (S1720).

Figure 21:
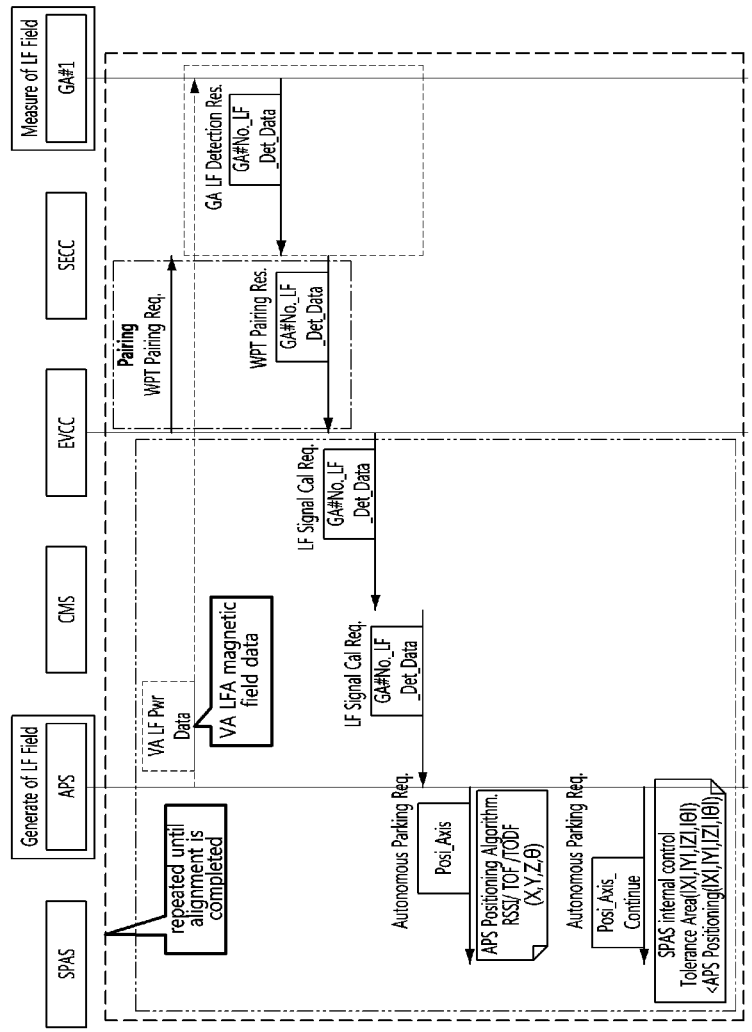
FIG. 21 illustrates an example of a detailed message flow transferred between components performing relevant operations in a pairing step of a position alignment method according to an exemplary embodiment of the present invention.

FIG. 21 illustrates an example of a detailed message flow transferred between components performing relevant operations in a pairing step of a position alignment method according to an exemplary embodiment of the present invention. As shown in FIG. 21, when the EVCC transmits a WPT pairing request to the SECC, the APS of the EV may be configured to generate an LF magnetic field, and the GA1, which is the target GA, may be configured to measure the LF magnetic field and return a measured magnetic field value. The procedure shown in FIG. 21 may be repeated until the alignment between the EV and the GA is completed.

Figure 22A:
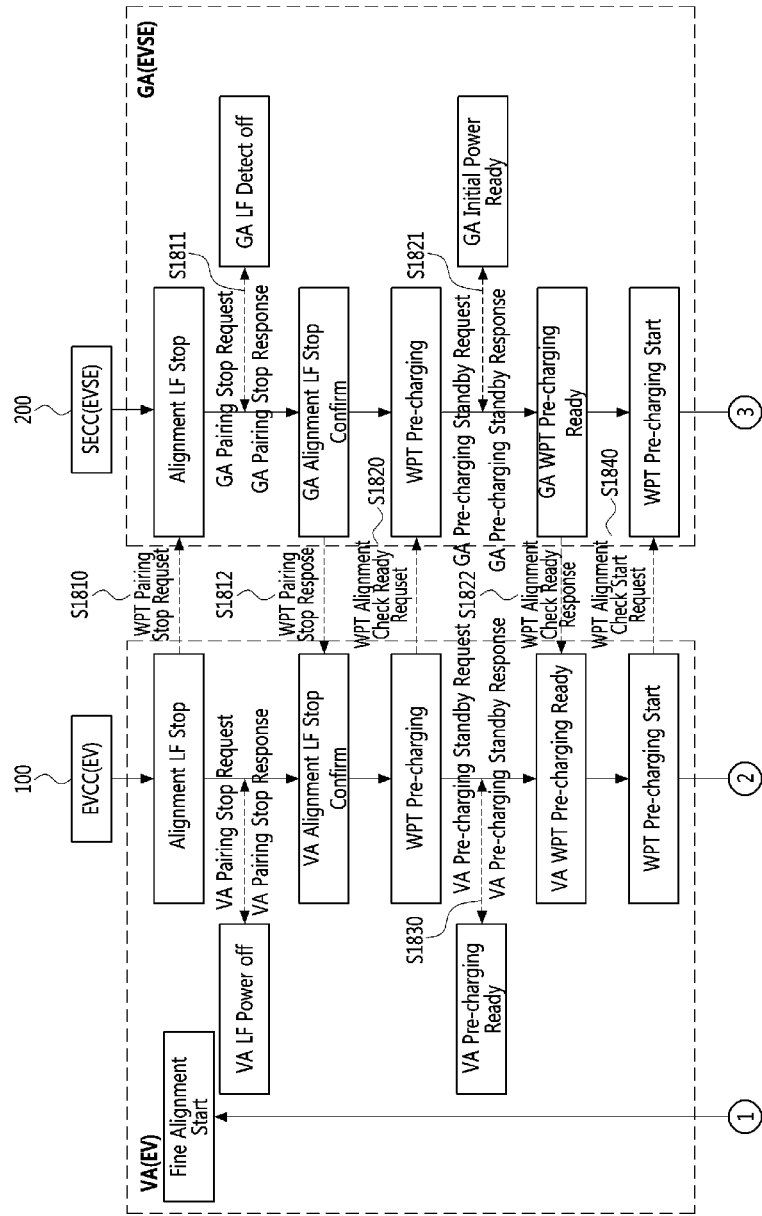
FIG. 22A and FIG. 22B illustrate an example of an operation flow in a position alignment termination or a wireless charging preparation step of a position alignment method according to an exemplary embodiment of the present disclosure.
Figure 22B:
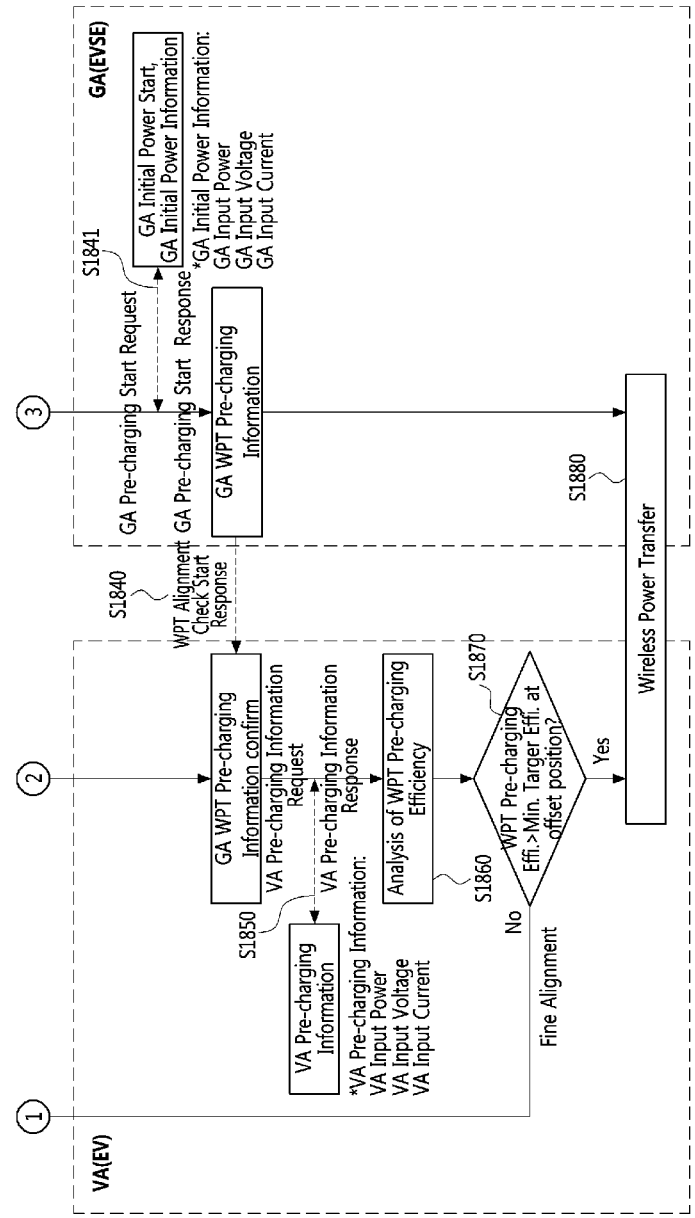

FIG. 22A and FIG. 22B illustrate an example of an operation flow in a position alignment termination or a wireless charging preparation step of a position alignment method according to an exemplary embodiment of the present disclosure.

The SPAS of the EV may be configured to provide a notification to the CMS of the EV that the alignment is complete when the coordinate received from the APS of the EV exceeds a particular threshold (e.g., a tolerance area specified by a standard). The CMS of the EV may be configured to transmit an acknowledgment signal to the SP of the EV, and request the EV APS to stop outputting the LF magnetic field to verify whether the position alignment is complete. The CMS of the EV may be configured to receive a signal indicating that the magnetic field output of the LF antenna is stopped from the APS of the EV, and instruct the EVCC of the EV to transmit a position alignment stop signal to the SECC of the EVSE to determine whether the position alignment is completed.

The EVCC of the EV may be configured to transmit the position alignment stop signal using the LF the SECC of the EVSE (S1810). The SECC of the EVSE may be configured to request the GA of the EVSE to stop outputting the detected magnetic field values (S1811). The SECC of the EVSE may be informed that the detected magnetic field values are stopped to be outputted from the GA of the EVSE, and be configured to transmit a position alignment stop response signal using to the EVCC of the EV (S1812).

The EVCC of the EV may be configured to request a pre-charging power supply preparation signal to the SECC of the EVSE to detect the position alignment state and determine whether the wireless charging can be performed (S1820). The SECC of the EVSE may be configured to request the GA of the EVSE to prepare the pre-charging power supply (S1821). In particular, the pre-charging power to be used may be less than the maximum charging request amount required by the vehicle since an electric power network does not supply electric power to the vehicle unilaterally but the vehicle takes necessary electric power from the electric power network.

When the SECC of the EVSE receives from the GA of the EVSE a signal indicating that the electric power for the pre-charging may be supplied, the SECC of the EVSE may be configured to transmit a pre-charging power ready signal for confirmation of the position alignment and the wireless charging to the EVCC of the EV (S1822).

Meanwhile, to confirm the position alignment and determine whether the wireless charging may be performed, the EVCC of the EV may be configured to transmit to the CMS of the EV a signal requesting preparation for receiving the pre-charging power (S1830). The CMS of the EV may be configured to request the VA of the EV to prepare to receive power for the pre-charging, and receive from the VA of the EV a signal indicating that the VA is ready to receive power for pre-charging. The EVCC of the EV may be configured to receive from the CMS of the EV the signal indicating that the EV is ready to receive power for pre-charging.

When the preparation for the pre-charging is completed, the EVCC of the EV may be configured to request the SECC of the EVSE to supply the pre-charging power (S1840). The SECC of the EVSE may be configured to request the GA of the EVSE to supply the pre-charging power, and receive from the GA of the EVSE a signal indicating the pre-charging power is started and information regarding the pre-charging power supplied by the GA of the EVSE. The information regarding the pre-charging power supplied by the GA of the EVSE may include information regarding an input power supplied by the GA of the EVSE for calculation of a charging efficiency in the CMS.

Thereafter, the GA of the EVSE may be configured to supply the pre-charging power to the EV. The EVCC of the EV may be configured to receive from the SECC of the EVSE the signal indicating that the wireless power supply is started and the information regarding the pre-charging power supply by the GA of the EVSE (S1842). The CMS of the EV may be configured to receive from the EVCC of the EV the signal indicating that the wireless power supply is started and the information regarding the pre-charging power supply by the GA of the EVSE. The CMS of the EV may be configured to request the information on the pre-charging power supply to the VA of the EV, and receive it (S1850).

Particularly, the information regarding the pre-charging power supply requested to the VA of the EV may be used for calculating the charging efficiency in the CMS, and may include information regarding an output power supplied by the VA of the EV to a battery management system (BMS). The CMS of the EV may use an internal algorithm to calculate a ratio of the output power supplied by the VA of the EV to the output power (i.e., VA input power in FIG. 21) supplied by the VA of the VE to the BMS of the EV, which is a pre-charging efficiency (S1860). When the pre-charging efficiency is less than or equal to the minimum required efficiency at the boundary position ('No' in S1870), the fine alignment step may be performed again. In other words, returning to the step S1640 shown in FIG. 18, the CMS of the EV may be configured to request the EVCC of the EV to restart the position alignment, and the EVCC of the EV may be configured to request the SECC of the EVSE to restart the position alignment.

When the pre-charging efficiency is greater than the minimum required efficiency at the boundary position ('Yes' in S1870), a main wireless charging power transfer step may be performed (S1880). In particular, the CMS of the EV may be configured to request the EVCC of the EV to supply a main wireless charging power, and inform the VA of the EV of the main wireless charging power. The subsequent procedures may be the same as those of the EV conductive charging.

Figure 23A:
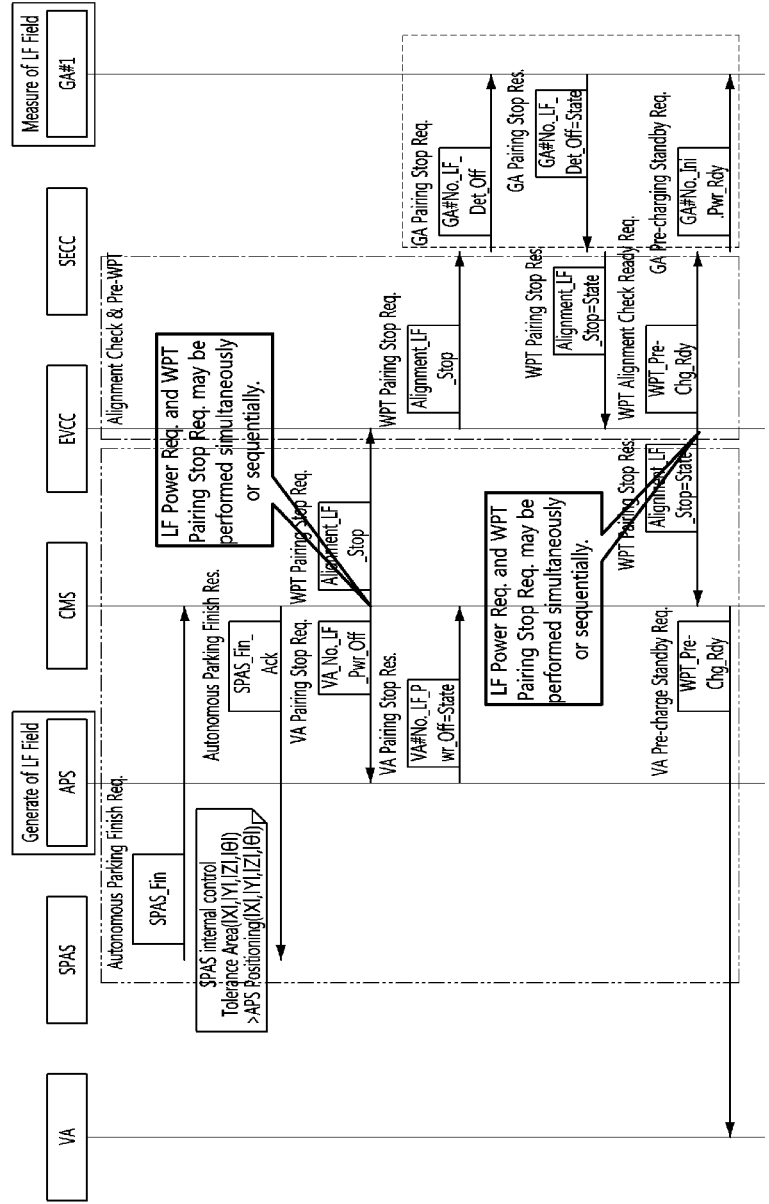
FIGS. 23A to 23C illustrate an example of a detailed message flow transferred between components performing relevant operations in a position alignment termination or a wireless charging preparation step of a position alignment method according to an exemplary embodiment of the present disclosure.
Figure 23B:
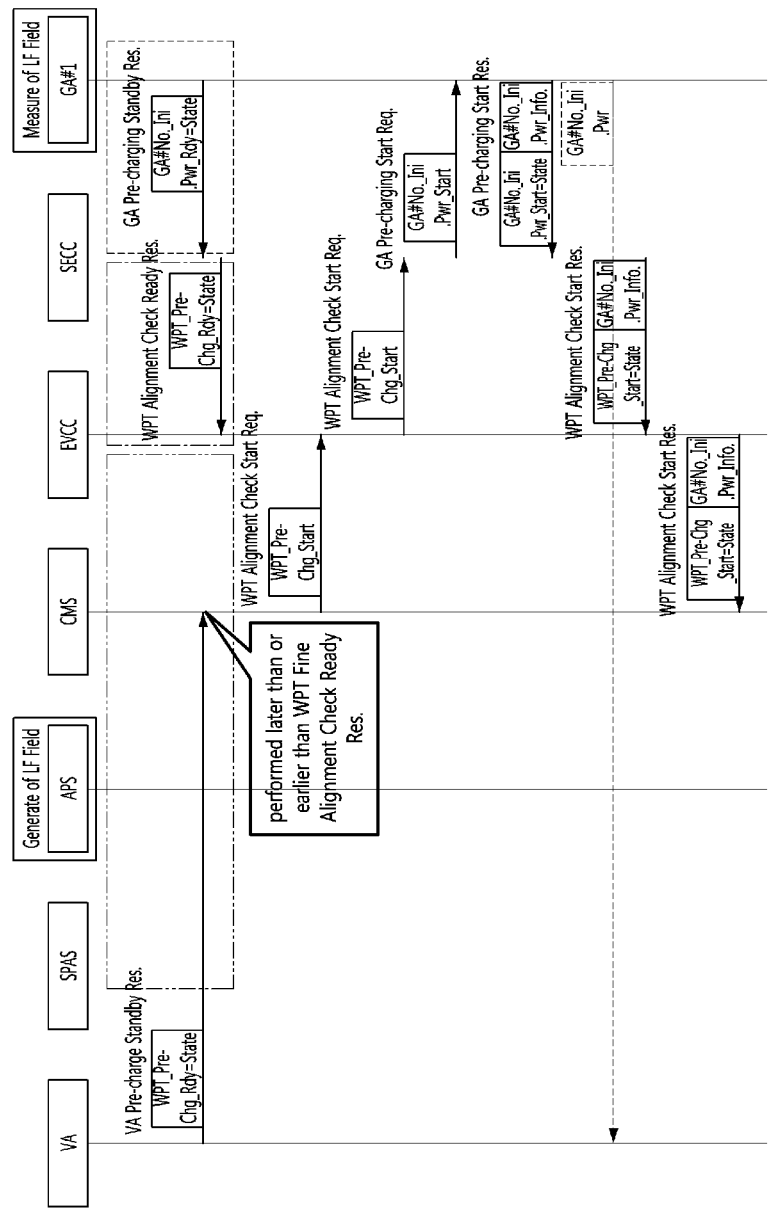
Figure 23C:
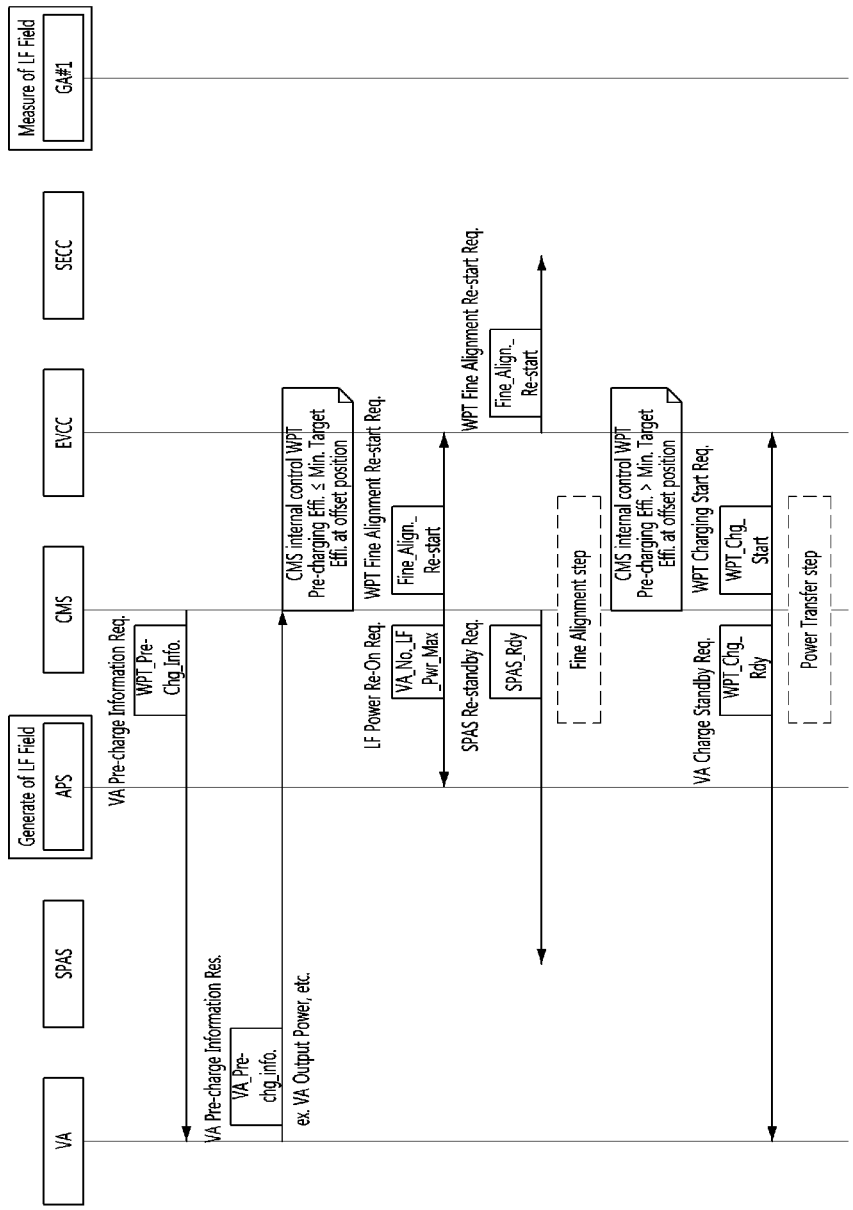

FIGS. 23A to 23C illustrate an example of a detailed message flow transferred between components performing relevant operations in a position alignment termination or a wireless charging preparation step of a position alignment method according to an exemplary embodiment of the present disclosure.

While some aspects of the present disclosure have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In exemplary embodiments, a programmable logic device (e.g., a field programmable gate array (FPGA)) may be used to perform some or all of the functions of the methods described herein. In addition, the FPGA may operate in conjunction with a microprocessor to perform one of the methods described herein. Generally, the methods are preferably performed by some hardware device.

While the exemplary embodiments of the present disclosure and their advantages have been described in detail, it should be understood that various changes, substitutions, and alterations may be made herein without departing from the scope of the present disclosure.

What is claimed is:

1. A position alignment method for wireless charging, performed by a vehicle assembly (VA) for position alignment with a target ground assembly (GA) among a plurality of GAs, the position alignment method comprising:
    identifying states of the plurality of GAs via wireless communication with a supply equipment communication controller (SECC) configured to operate the plurality of GAs;
    receiving, from the SECC, information regarding one or more available GAs of the plurality of GAs;
    selecting the target GA based on the information regarding the one or more available GAs, and performing a wireless communication association with the target GA;
    performing a procedure for position alignment approval and a procedure for authentication by a request to the SECC; and
    in response to determining that the authentication is successful, performing position alignment with the target GA using low-frequency (LF) signals,
    wherein LF signals assigned to each GA are distinguished from LF signals assigned to other GAs in a time division multiplexing (TDM) scheme.

2. The position alignment method according to claim 1, wherein the information regarding the one or more available GAs includes at least one selected from the group consisting of: a GA identifier (ID), unique information of an LF system, and wireless signal strength information of each GA among the one or more available GAs.

3. The position alignment method according to claim 2, wherein the unique information of the LF system includes at least one selected from the group consisting of: an LF collision avoidance signal, an LF ID, LF antenna information, and magnetic field detection sensitivity per antenna of the each GA among the one or more available GAs.

4. The position alignment method according to claim 1, wherein the selecting of the target GA includes:
    comparing wireless signal strengths of the one or more available GAs with each other; and
    selecting a GA having a highest wireless signal strength as the target GA.

5. The position alignment method according to claim 1, wherein each of the states of the plurality of GAs is classified into a normal state capable of wireless charging, a charging state, and an aligned state.

6. The position alignment method according to claim 1, wherein the performing of the wireless communication association with the target GA includes modifying LF information of the EV based on LF information of the selected target GA.

7. The position alignment method according to claim 6, wherein the LF configuration information of the EV to be modified includes at least one selected from the group consisting of: an LF collision avoidance signal, a SYNC, a VA ID, and an LF ID.

8. A position alignment apparatus performing position alignment with a target ground assembly (GA) among a plurality of GAs, the position alignment apparatus including at least one processor and a memory storing at least one instruction executable by the at least one processor, wherein when executed by the at least one processor, the at least one instruction is configured to:
    identify states of the plurality of GAs via wireless communication with a supply equipment communication controller (SECC) configured to operate the plurality of GAs;
    receive from the SECC information regarding one or more available GAs of the plurality of GAs;
    select the target GA based on the information regarding the one or more available GAs, and perform a wireless communication association with the target GA;
    perform a procedure for position alignment approval and a procedure for authentication a request to the SECC; and
    in response to determining that the authentication is successful, perform position alignment with the target GA using low-frequency (LF) signals,
    wherein LF signals assigned to each GA are separated from LF signals assigned to other GAs in a time division multiplexing (TDM) scheme.

9. The position alignment apparatus according to claim 8, wherein the information regarding the one or more available GAs includes at least one selected from the group consisting of: a GA identifier (ID), unique information of an LF system, and wireless signal strength information of each GA among the one or more available GAs.

10. The position alignment apparatus according to claim 9, wherein the unique information of the LF system includes at least one selected from the group consisting of: an LF collision avoidance signal, an LF ID, LF antenna information, and magnetic field detection sensitivity per antenna of the each GA among the one or more available GAs.

11. The position alignment apparatus according to claim 8, wherein the selecting of the target GA includes:
    comparing wireless signal strengths of the one or more available GAs with each other; and
    selecting a GA having a highest wireless signal strength as the target GA.

12. The position alignment apparatus according to claim 8, wherein each of the states of the plurality of GAs is classified into a normal state capable of wireless charging, a charging state, and an aligned state.

13. The position alignment apparatus according to claim 8, wherein the performing of the wireless communication association with the target GA includes modifying LF information of the EV based on LF information of the selected target GA.

14. The position alignment apparatus according to claim 13, wherein the LF information of the EV to be modified includes at least one selected from the group consisting of: an LF collision avoidance signal, a SYNC, a VA ID, and an LF ID.

15. A method for controlling position alignment for wireless charging, performed by a supply equipment communication controller (SECC) configured to operate a plurality of ground assemblies (GAs), the method comprising:
providing information regarding states of one or more available GAs to an electric vehicle (EV) entering into a wireless communication region of the SECC;
performing a wireless communication association between an EVCC of the EV and an SECC of a target GA selected by the EV among the one or more available GAs;
performing a procedure for position alignment approval and a procedure for authentication with the EV and the target GA according to a request of the EVCC; and
in response to determining that the authentication is successful, performing position alignment between the EV and the target GA using low-frequency (LF) signals,
wherein LF signals assigned to each GA are separated from LF signals assigned to other GAs in a time division multiplexing (TDM) scheme.

16. The method according to claim 15, wherein the information regarding the one or more available GAs includes at least one selected from the group consisting of: a GA identifier (ID), unique information of an LF system, and wireless signal strength information of each GA among the one or more available GAs.

17. The method according to claim 16, wherein the unique information of the LF system includes at least one selected from the group consisting of: information regarding an LF collision avoidance signal, an LF ID, LF antenna information, and magnetic field detection sensitivity per antenna of the each GA among the one or more available GAs.

18. The method according to claim 16, wherein the performing of the wireless communication association between the EVCC of the EV and the SECC of the target GA includes determining a wireless communication error by detecting whether a GA ID of the target GA, which is received from the EVCC, is changed.

19. The method according to claim 16, wherein the performing of the procedure for position alignment approval and the procedure for authentication includes verifying an error by comparing an LF collision avoidance signal received from the EVCC with an LF collision avoidance signal held by the target GA.

20. The method according to claim 16, wherein the providing of the information regarding states of one or more available GAs includes, when a preceding vehicle aligned with a GA exists, providing a notification regarding the detection of the preceding vehicle to the vehicle entering into the wireless communication region of the SECC.

* * * * *